June 18, 1968  C. G. CANNON ETAL  3,388,545
CORE YARNS AND A PROCESS AND APPARATUS
ASSEMBLY FOR MAKING THEM Filed Dec. 23, 1965  8 Sheets-Sheet 3

INVENTORS
CYRIL GEORGE CANNON
BARRIE LINTON DAVIES
ALAN SELWOOD
ROY ALAN WILLIAMS
BY Cushman Darby & Cushman
ATTORNEYS

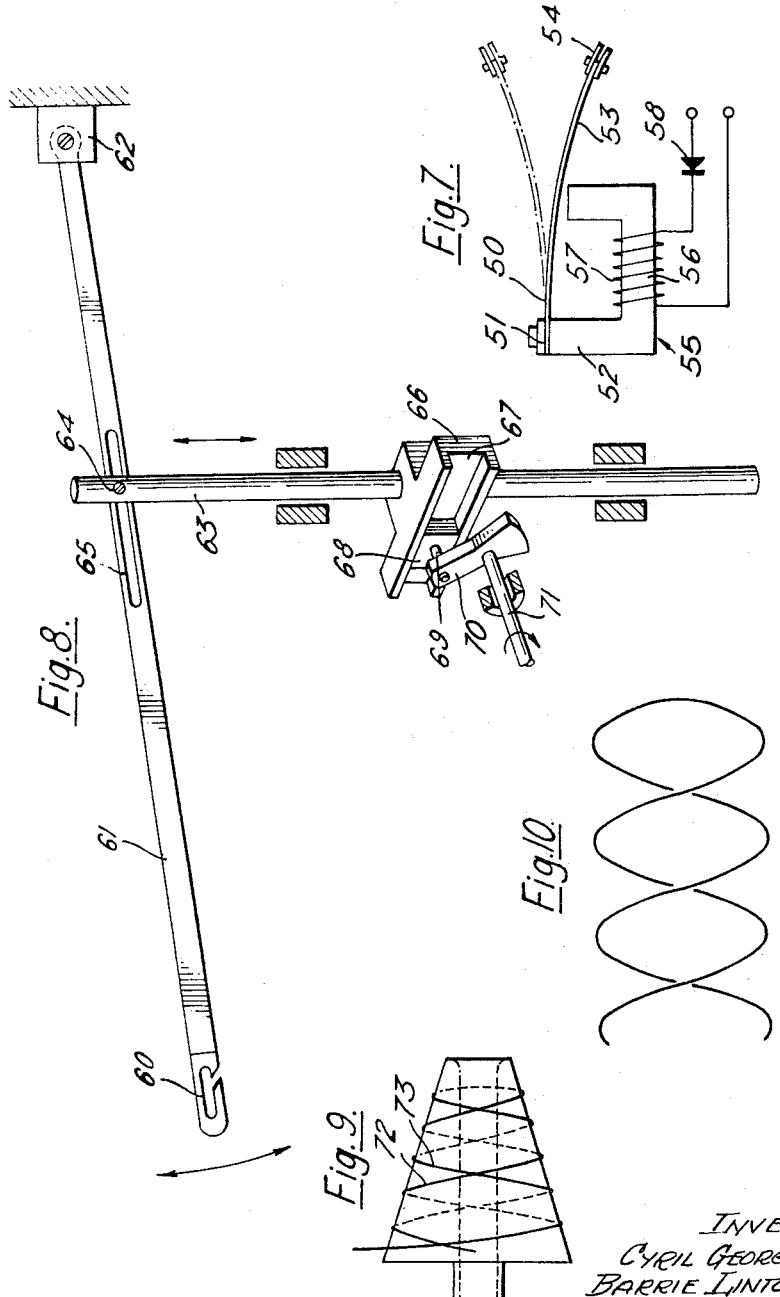

INVENTORS
CYRIL GEORGE CANNON
BARRIE LINTON DAVIES
ALAN SELWOOD
ROY ALAN WILLIAMS

By
Cushman Darby & Cushman
Attorneys

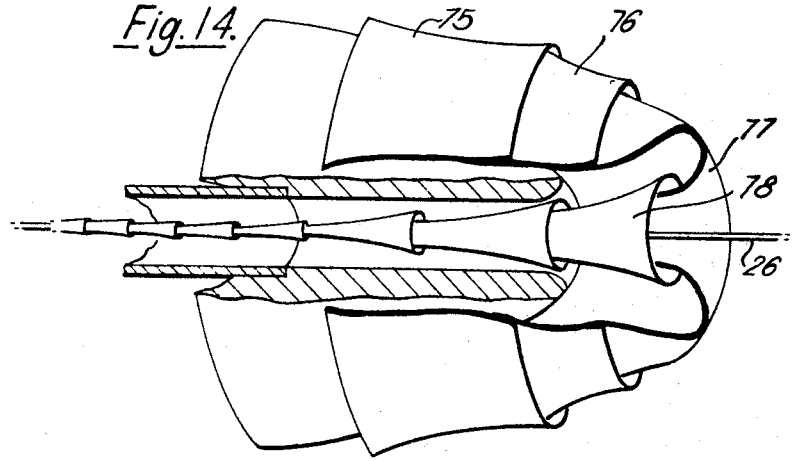
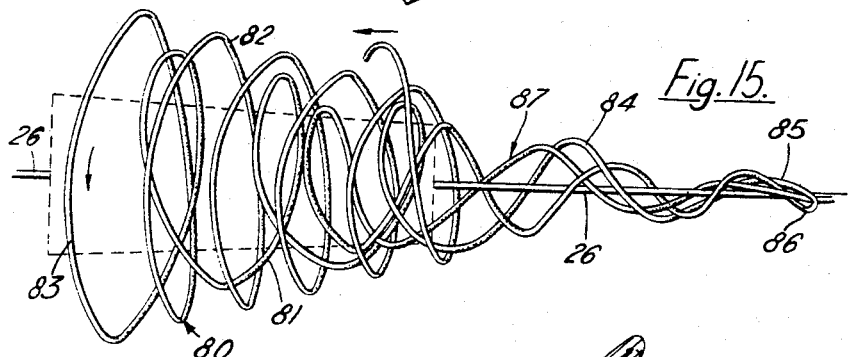
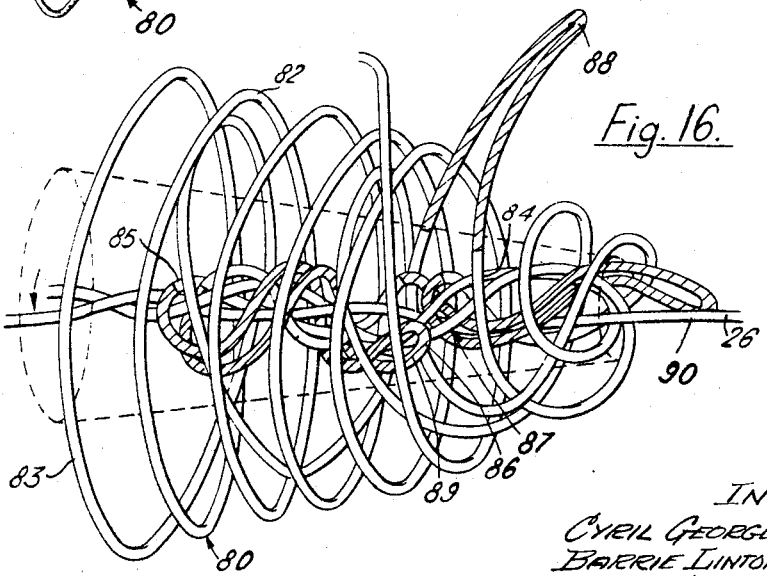

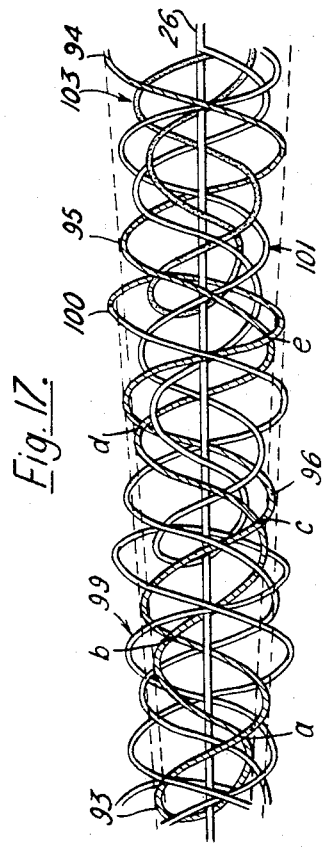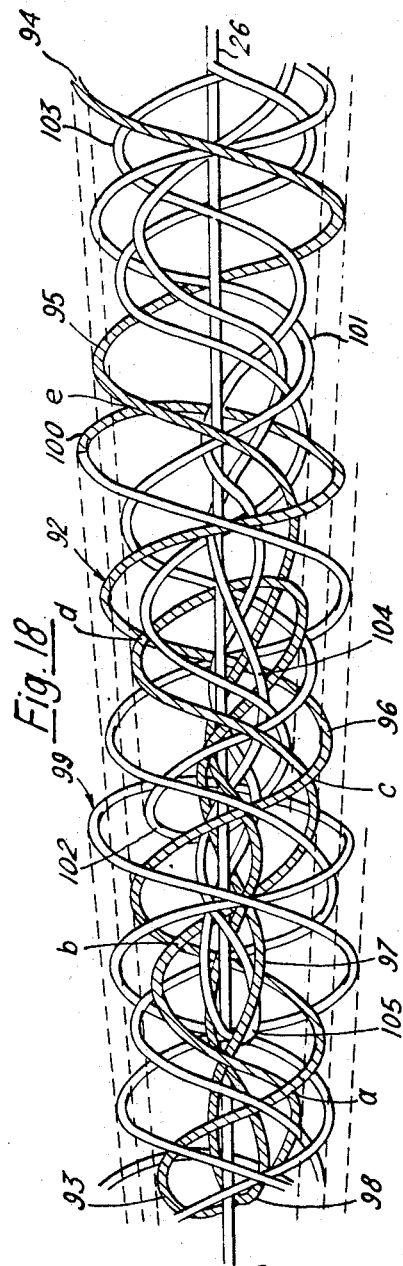

June 18, 1968

C. G. CANNON ETAL 3,388,545

CORE YARNS AND A PROCESS AND APPARATUS
ASSEMBLY FOR MAKING THEM

Filed Dec. 23, 1965

INVENTORS
CYRIL GEORGE CANNON
BARRIE LINTON DAVIES
ALAN SELWOOD
ROY ALAN WILLIAMS

By Cushman, Darby & Cushman
Attorneys

3,388,545
CORE YARNS AND A PROCESS AND APPARATUS ASSEMBLY FOR MAKING THEM

Cyril George Cannon, Usk, Barrie Linton Davies, Langstone, Alan Selwood, Llanyravon, Cwmbran, and Roy Alan Williams, Llansapley, England, assignors to British Nylon Spinners, Limited, Pontypool, England, a corporation of Great Britain
Filed Dec. 23, 1965, Ser. No. 515,879
Claims priority, application Great Britain, Dec. 24, 1964, 52,523/64, 52,524/64
2 Claims. (Cl. 57—140)

ABSTRACT OF THE DISCLOSURE

A core yarn and apparatus and method for making the same, the yarn comprising a core strand and a wrapping component provided by one or more continuous filaments in the form of random, serially-connected, axially-extending variable length loops arranged so that they progressively advance along and twist around the core strand.

---

This invention relates to a core yarn derived from the wrapping of one or more freshly formed continuous filaments around a core strand, in which the continuous filament constituting the wrapping component, or each filament therein, takes the form of a multiplicity or serially-connected loops helically twisted around the core strand with many of the loops contained for at least part of their length within other loops, so providing an approximately tubular sheath having a high bulk density and a low bulk factor, and a process and apparatus assembly for making it.

In the long established method of manufacturing core yarns a continuous filamentary core is introduced into a conventional spinning or drafting frame together with one or more rovings of staple fibres and, by means of a rotating hollow spindle, or like mechanical device, the draft staple fibres are wrapped, as a more or less continuous sheath, around the continuous filamentary core.

Despite its widespread application and time-honoured use, this traditional method is not without its disadvantages. These primarily are associated with the necessity of employing a rotating hollow spindle to wrap the staple fibres around the core, for this imposes limitation on the productivity rate, gives rise to mechanical difficulties when operating at high speeds because of the problems of friction and lubrication, and demands that the overall operation be constantly supervised.

The well recognised deficiencies of this method have stimulated efforts toward deriving alternative ways of manufacturing core yarns, and these have fructified in several approaches which have been proposed at various times for attaining this end.

In one approach, developed in recent years, a core and a wrapping strand are separately, but simultaneously, introduced into a device, wherein the wrapping strand is wound, without the assistance of any mechanical means, around the core strand so providing a core yarn. Within this general approach there have been proposed a variety of methods differing in the specific procedure used to condense the wrapping strand around the core strand. As an instance of one such method, Marshall in a series of United States patent specifications, including United States patent specification No. 3,041,812, issued on July 3, 1962 and United States patent specification No. 3,076,-307 issued on Feb. 5, 1963, describes the manufacture of a core yarn from a core strand and a wrapping strand by introducing the two strands, tensioned in an appropriate manner, at different rates, separately, but simultaneously, into a fluid vortex containing a rapidly rotating mass of air. This rapidly roating air acts upon the wrapping strand, which is preferably introduced under little or no restraint so that it always has some slack, to form loops therefrom, and those loops are then wrapped, by the whirling fluid, around the core strand. The wrapping in the resulting core yarn is described as being constituted by a multiplicity of loops disposed at various angles to each other, but essentially with the loops lying in planes generally perpendicular to the main axis of the core yarn. This arrangement and disposition of loops around a core strand provides a bulky sheath of high volume, and a very low density.

The methods devolped in the various approaches proposed in the search for a new and improved way of manufacturing core yarns usually envisage utilising as the wrapping strand, a spun staple or a continuous filament yarn withdrawn from a suitable package assembled from yarn after it has been subjected to the various operations, for instance, in the case of a spun staple yarn, carding, drafting and spinning, associated with its formation. The derivation of the wrapping strand from a yarn of this kind, necessarily implies that the overall process involved in the making of the yarn is a sequence of discontinuous, often expensive and time-consuming operations, which adversely affects the ultimate cost of core yarns.

This invention has for one of its objects the provision of a core yarn in which the wrapping, in the form of an approximately tubular sheath, is constituted by serially-connected loops derived from one or more freshly formed continuous filaments, arranged around the core strand in a unique and advantageous manner.

This invention has for another of its objects the provision of a process for making a novel core yarn which utilises as the wrapping component one or more freshly formed continuous filaments so that the overall process is integrated with the extrusion and making of the continuous filaments constituting the wrapping component.

Another object of the invention is to provide suitable apparatus assembly for exercising the above process.

Other objects of this invention will become apparent in the course of the following description and claims, and by reference to the accompanying drawings.

In fulfillment of the first objective, the invention, when considered from one of its aspects, provides a core yarn comprising a centrally disposed core strand and a wrapping component constituted by one or more continuous filaments in the form of a multiplicity of serially-connected, essentially axially-extending loops arranged so that they progressively advance along the axis and helically twist around the core strand with a helical angle between 10 and 80, preferably 30° and 80°, many of the loops being contained for at least part of their length within another loop thereby providing a nest of loops which, as a continuous, relatively tight, approximately tubular sheath, completely envelops the core strand.

The helically wrapped loops, which together constitute the nest of loops, are arranged in a series of concentric shells around the core strand. Within the nest of loops, the essential pattern is that of serially-connected loops, progressively advancing along the main axis of the core yarn, and helically twisted around the core strand, with successive, partially overlaid loops staggered from one another in an echelon formation.

The arrangement and disposition of the serially-connected loops as a nest of concentric shells providing a relatively tight, continuous, approximately tubular sheath conforming to the contours of the core strand is reflected in some of the characteristics of the sheath. For instance, the sheath has a low volume, and a correspondingly high bulk density, usually in the range of 0.15 to 1 gm./cc.$^3$, preferably 0.2 to 1 gm./cc.$^3$; a low bulk factor as herein defined, usually less than 10 per cent, preferably less than 8 percent; and a twist factor of between ¾ and 20, preferably between 1 and 16.

The unique, and advantageous manner in which the serially connected loops are arranged around the core strand, which serves to distinguish the core yarns provided by this invention from any previously described, may be attained by following the procedure involved in the novel process provided by this invention.

This process, which is another aspect of this invention, comprises forming a continuous filament by the extrusion of an artificial polymeric material, passing the continuous filament as formed to a rotating body around which the filament is wrapped, and which has a peripheral speed sufficient to apply tension to, and to attenuate the continuous filament being passed thereto, imparting to the filament in the course of its passage to the body a reciprocating movement whereby the filament is assembled around the body in the form of a sleeve comprising overlaid and interconnected helices continuously withdrawing the sleeve endwise from the body, introducing within the sleeve, during its withdrawal from the body, a core strand which is simultaneously moved along the axis of rotation at a speed less than the peripheral speed of the body, and which is enveloped by the sleeve serving as a wrapping component, and collecting the core yarn so obtained in an orderly manner.

In effecting the introduction of the core strand within the sleeve during its withdrawal from the rotating body, the former may be passed through an axially-extending passage within the body in the same direction as that in which the sleeve is moved off the body so that as, or shortly after, the core strand emerges from the body, the sleeve is associated therewith. The resulting composite structure is then moved away from the body along the axis of rotation.

Alternatively, the core strand may be moved through an axially-extending passage within the body in the opposite direction to that initially taken by the sleeve during its withdrawal therefrom, so that the association between the two is accompanied by eversion of the sleeve and the withdrawal of the composite structure through the passage in the body. The eversion of the sleeve in this manner is often associated with the formation of a sheath having an enhanced uniformity of thickness along its length which implies that the core yarn product will have an improved denier regularity.

The nature of the core strand, and the material of which it is made, are not critical to the successful practice of this invention, and a diversity of materials may be employed in this role in the form of a spun staple or continuous filament yarn, or as a monofilament, or indeed, any other kind of continuous, thin, elongated structure. Among the many materials, including, for instance, high molecular weight polymers, of which the core strand may be made, two materials are worthy of special mention, since they provide core yarns with properties which make them particularly suitable for certain applications. For instance, an insulated electrical conductor may be obtained by utilising as the core strand, an electrical conductor, such as, an aluminum or copper wire. A completely different kind of core yarn, in the form of an elastic yarn suitable for incorporation in elastic fabrics used in the manufacture, for instance, of woven or knitted swimwear, hosiery, brassieres and pyjamas, and which is covered by a continuous, approximately tubular sheath of novel, and advantageous, structure, may be made by using an elastic core strand. Suitable elastic core strands may be made of rubber or some synthetic elastomeric material, of which a wide variety exist.

It will be apparent that the core of the yarns of this invention may be constituted by two or more strands which need not be of the same material.

The core strand introduced into the sleeve, requires to be maintained under a sufficient tension to ensure that it constantly follows a well-defined path and to provide it with a rigidity which enables it to resist disturbance under the impetus imparted by the enveloping wrapping component, so that the latter can condense around it in the form of a continuous, approximately tubular sheath. The tension level of a particular core strand compatible with the attainment of the desired structure is dependent upon, and responsive to, a number of factors, and it is virtually impossible to stipulate a tension level appropriate on any widespread scale. Despite this, the selection of a suitable, or even a preferred, tension level for a core strand when employing a particular apparatus assembly, presents no problem and can readily be determined empirically on the basis of a few, easily effected, adjustments to the operating conditions.

The sleeve assembled around the rotating body, and which, on withdrawal therefrom provides the wrapping component of the core yarn may be derived from one or more freshly formed filaments extruded from any artificial polymeric material, although variations are experienced, in the suitability of particular materials. In this connection, it has been demonstrated that filaments, herein referred to as plastic filaments, wherein the artificial polymeric material is in a substantially amorphous, plastic condition, at the time of their assembly around the rotating body, are associated with the formation of a relatively stable, readily manageable assembly of helices. Further, the presence within the assembly of plastic filaments is found to facilitate the progressive withdrawal of the sleeve from the body, and its transformation into a wrapping component from which is derived a stable, continuous sheath. The efficacy of plastic filaments in this context is believed, on information available at the present time, to be attributable to the fact that, in this condition, the filaments, although oriented, lack elastic recovery so that they are readily laid around the rotating body to provide a compact, and stable sleeve which is easily controlled, and managed. In contrast, a sleeve formed from filaments in crystalline form may, because of the liveliness of the filaments, be difficult to control and to maintain as a sleeve on the rotating body. The tractability of the plastic filaments also facilitates the wrapping of the withdrawn sleeve around the core strand and ensures good adaptation of the wrapping component to the contours of the latter. Moreover, when the artificial polymeric material subsequently becomes crystalline, the shape adopted by the plastic filaments when wrapped, in the form of loops, around the core, is set into the filaments thereby improving the stability of the wrapping.

The crystallisation of the plastic filaments constituting the wrapping component may substantially be completed, by exposure of the yarn to ambient conditions before the core yarn is collected. However, normally the rate of crystallisation under ambient conditions is slow but it may be increased by a subsequent treatment of the core yarn. Such a treatment may, when the wrapping component is constituted by plastic polyamide filaments, involve exposing the yarn to a humid atmosphere, heating the yarn, or by applying a swelling agent thereto. In the event that the wrapping component is constituted by polyester filaments, crystallisation may be induced by heating the core yarn or by the application of a suitable swelling agent.

The use of only one filament in the derivation of the wrapping component, and the formation therefrom of a continuous, approximately tubular sheath around the core strand, is a noteworthy point about the process of this invention. However, although the use of one filament may be desirable on economic grounds, or to provide a sheath of a desired thickness, many more filaments than one may be collected around the rotating body in the form of a sleeve from which the wrapping component is derived.

As the thickness of the sheath increases with the number of filaments which constitute it, there is an upper limit on the number of filaments which can be assembled into the sheath compatible with the formation of a core yarn acceptable for normal textile purposes.

Conveniently, the number of filaments collected on the rotating body and which consequently contribute to the formation of the wrapping component, does not exceed 50, although this will vary somewhat according to the actual denier of the filaments.

As the sleeve is withdrawn endwise from the surface of the body into association with the constantly advancing, tensioned core strand, it is elongated in an essentially axial direction so that the helics of which it was composed when assembled around the body are transformed into serially-connected complex loops. These loops, because of the rotary movement of the body are twisted around the core strand so that the sleeve condenses into a relatively tight wrapping conforming to the contours of the core strand.

Hence, the rotating body serves both to collect the freshly formed continuous filaments as a sleeve of overlaid and interconnected helices, and to spin the loops derived therefrom relatively tightly around the surface of the core strand in the form of a continuous, approximately tubular sheath.

The condensation of the initially voluminous sleeve, usually in the form of a hollow web comprising serially-connected complex loops, into a relatively tight wrapping around the core strand, may be assisted by constricting the sleeve shortly after its withdrawal from the rotating body. The constriction of the bundle of loops in this manner may be achieved by passing the composite structure consisting of the core strand and the enveloping, voluminous sleeve through a ring, or a tube or a like member, which is essentially of circular cross-section, herein simply referred to as a guide member, located in the path of the structure and close to the point where the sleeve leaves the rotating body. The reinforcement of the effect of the rotating body in spinning the sleeve down onto the core strand, by constricting the initially voluminous assembly of loops of which it is formed, usually provides a sheath with an enhanced uniformity of thickness so that the core yarn product has an improved denier regularity and overall a more regular structure.

This invention, when considered from another of its aspects, provides an apparatus assembly for making a core yarn which includes:

(a) Means for extruding an artificial polymeric material into one or more continuous filaments;

(b) A traverse mechanism located some distance away from the extrusion means and arranged to impart a reciprocating movement to the filaments;

(c) A body arranged to rotate with a peripheral speed sufficiently high to apply tension to the filament and to assemble the filament around it in the form of a sleeve comprising overlaid and interconnected helices;

(d) Means for withdrawing the sleeve endwise from the body at a slower speed than the peripheral speed thereof;

(e) Source of core strand;

(f) Means for introducing a core strand withdrawn from the source therefor into the sleeve following the withdrawal of the latter from the body; and (g) Means for collecting the core yarn in an orderly manner.

In a convenient apparatus assembly in accordance with this invention, a conventional package building apparatus, in which the wind-up means usually is either a reciprocating traverse or a twister, accomplishes not only the orderly collection of the core yarn product but the introduction, by continually pulling it along a defined path, of the core strand into the sleeve during its withdrawal from the body, and the movement of the composite structure away from the body. When the rotatable body contains an axially-extending passage the core stand may be advanced therethrough in the same direction as that in which the sleeve is withdrawn and thereby introduced within it. Alternatively, the composite structure resulting from the association of the core strand with the withdrawn sleeve which is concurrently everted, may be taken away through the passage.

A pair of co-operating forwarding rolls, or a conventional tensioning device such as a gate tensioner, interposed between the rotatable body and the package from which the core strand is withdrawn, may also be provided to control more definitely the tension on the core strand.

Further, it may be advantageous from the standpoint of providing an improved core yarn, to incorporate in the apparatus assembly a stationary guide member, typically a ring, or a straight or curved tube, or like member of an essentially circular cross-section, located in the path of the composite structure. This guide member should have a bore of a size such that the initially voluminous sleeve enveloping the core strand makes direct frictional contact therewith so that, by constricting the sleeve, it assists the condensation thereof into a relatively tight, conforming wrapping around the core strand. To enable it to function in this manner, the guide member should be located with at least the inlet orifice in spaced proximate relation to the end of the body from which the sleeve is withdrawn or, in those instances in which the composite structure is moved through the axially-extending passage following eversion of the sleeve, within the passage close to the entrance thereof. When the latter procedure is followed it may be possible to attain the same effect without a guide member by making the axially-extending passage with a bore, which at least at the end portion around the entrance thereof, is sufficiently narrow in size to constrict the everted sleeve. However, even in circumstances where this is possible, it is often more convenient to employ a readily adjusted, easily obtained guide member, say, a stationary tube.

Quite apart from its role in guiding the composite structure as it moves toward the wind-up device and assisting in the spinning of the initially voluminous sleeve around the core strand, the guide member is found to facilitate the continuous operation of the process of this invention to produce the desired core yarn.

Before proceeding with the detailed description of this invention it may facilitate a better understanding thereof to define certain terms used above and throughout the description and in the claims appended to the specification.

DEFINITIONS

*Continuous filament*

The term "continuous filament" as used herein and in the claiming clauses hereof refers to filaments which are of an indefinite length and which in the practice of the process of this invention are continuously supplied by extrusion from a source of the artificial polymeric material. The term does not include short length fibres, commonly referred to as staple fibres.

*Bulk factor*

This is defined as the percentage change in the diameter of the core yarn on the application thereto of a given load, and it can conveniently be determined by means of a conventional calibrated thickness gauge. In this specification and claims, the bulk factors quoted are determined in the following manner.

Five turns of the yarn are wound under a tension of 0.01 gm. per denier around a flat plate 1 mm. thick and 10 cms. long, with the loops of the winding spaced apart a distance of 2½ mm. The plate is supported on the stage (¾ inch diameter) of a conventional calibrated thickness gauge with the loops of the sheath lying symmetrically across the stage. The top plate (¾ inch diameter) of the gauge is then lowered onto the yarn under a load of 10 gms. and the gauge reading taken at a steady value. This reading indicates the approximate initial thickness of the core yarn, the low weight having little effect thereon apart from flattening any surface irregularities.

The loading is then increased to 50 gms. and the gauge is again read when steady. From the two readings on the thickness gauge, the percentage decrease in diameter, resulting from the application of the 50 gms. load, is determined. The percentage decrease is related to the void volume present in the sheath, and the value obtained is an indication of degree of compaction of the sheath, and the closeness of the packing between individual concentric layers within it. The percentage decrease in diameter is relatively low for the core yarns of this invention which have a compact, tightly wrapped, approximately tubular sheath, and it is much more for core yarns wherein the wrapping component is constituted by an array of predominantly radially disposed loops.

Bulk density

The bulk density of the sheath is defined as the specific mass of the sheath divided by the specific volume thereof. The sheath in the core yarns of this invention, because it comprises a series of concentric shells, comprising loops wrapped relatively tightly around the core strand, has a low specific volume and consequently, a relatively high bulk density.

Twist factor

This is defined (see, for instance, "Textile Terms and Definitions," 4th edition, published by the Textile Institute, Manchester) as the actual twist divided by the square root of the cotton count. The relationship between the cotton count and yarn denier is well known and a denier value can readily be converted into the corresponding cotton count.

In a preferred way of putting into practice the process of this invention, the core strand, after being withdrawn from a suitable package, is passed in the nip between a pair of cooperating feed rolls, then through an axially-extending passage in a rotating body, either prior, or subsequently, to the envelopment of the core strand with the wrapping component, and then it is advanced to a wind-up device. The forwarding rolls in association with the wind-up device tensions the core strand to the desired degree and ensures that it moves at a controlled speed which is always considerably less than the peripheral speed of the rotating body.

When the continuously advancing core strand is suitably tensioned between the wind-up device and the forwarding rolls, propagation of the continuous filament sleeve, from which the wrapping component is derived, is commenced. To this end continuous filaments are extruded through the orifices in a spinneret from a source of an artificial polymeric material and one (or more) of the continuous filaments is passed along a generally defined path, conveniently downwards, until it has substantially completely solidified, when it is lead through a traverse mechanism and then onto the rotating body around which the filament is wrapped in the form of a sleeve comprising a number of overlaid and interconnected helices.

The sleeve is then moved along the surface of the body, so that the direction of its forward movement is essentially parallel to the axis of rotation, and the leading part thereof is withdrawn endwise from the body and pulled down onto the continuously advancing core strand introduced into the sleeve during its withdrawal. The sleeve, whilst it is continuously propagated by a filament (or filaments) being passed to the rotating body, is also continuously pulled off the body in a progressive and controlled manner, so that the sleeve can be regarded as a transient assembly of a wrapped filament (or filaments).

In one procedure involved in the process of this invention, the sleeve after being withdrawn from the body is moved away therefrom, in the same direction as that in which it was moved along the surface of the body, and then associated with the core strand, which is also advancing in that direction after having passed through the axially-extending passage in the body.

In another procedure involved in the process of this invention, the direction of forward movement of the sleeve is reversed more or less simultaneously with its movement off the surface of the body, and it is associated with the core strand within the axially-extending passage in the body.

The reversal of the direction of movement in this manner everts the sleeve, and transfers the loops which project outwards from the main mass of the sleeve when it is assembled around the rotating body to the interior of the structure which is pulled through the passage in association with the core strand.

The withdrawal of the sleeve is accompanied by its axial elongation, and the wrapping component provided therefrom is initially in the form of a voluminous bundle of complex loops, loosely enveloping the core strand and this composite structure is advanced toward the wind-up device along a path which is that of the core strand. As this body is rotated rapidly relative to the linear rate of travel of the core strand, which defines the rate of withdrawal of the composite structure, the bundle of loops, initially voluminous, is spun relatively tightly around the core strand to form a dense, continuous sheath.

As indicated previously, it may be desirable, for the purpose of assisting the condensation of the bundle of loops around the core strand, to pass the composite structure, soon after the withdrawal of the sleeve from the body, and while the bundle of loops is still voluminous, through a guide member appropriately dimensioned to constrict by frictional contact therewith the bundle of loops. Preferably, the guide member, typically a guide ring or a stationary tube, which may be straight or curved, is located in the path along which the structure is moved, either within, partially or entirely, the axially extending passage in the body, or in spaced proximate relation to the end of the body from which the sleeve is withdrawn.

The resulting core yarn is taken up in a conventional manner by a suitable form of package building apparatus such as a winding device with a drum traverse or a ring twisting assembly.

The rotating body may have a variety of shapes, although it is preferred that it should be profiled so as to taper in the direction in which the sleeve is moved off it, for this facilitates the withdrawal of the sleeve as a coherent, integrated structure which is so important in conveying to the sheath of the core yarn some of its characteristic features. Particularly suitable rotating bodies are those which have a configuration described by a straight line generator. Examples include bodies which are conical, or frusto-conical, or essentially cylindrical in shape. In the context of cylindrically shaped bodies we mention that there has been used with conspicious success a body of cylindrical form which tapers ever so slightly (an angle of about 5°) toward the direction in which the sleeve is moved off it.

Bodies of an essentially hemispherical or parabolic shape may also be employed in the process of this invention.

The body may be constructed of metal, plastic, ceramic or any other suitable material. Conveniently, the body is provided with an integral shaft, which may be hollow, for connection to a suitable drive means. The axially-extending passage when present in the body must have a bore of a size sufficient to accommodate whatever is passed through it, whether the core strand alone or the composite structure comprising the core strand together with the wrapping component derived from the withdrawn sleeve.

The peripheral speed i.e. surface speed, of the rotating body around which the filament is wrapped in the form of superimposed and interconnected helices, must be of a magnitude such that the body imparts tension to the filament passing thereto. The application of tension to the filament by the rotating body attenuates it in the distance between the spinneret face and the point where the filament is substantially completely solidified. Furthermore, under the impetus imposed by the rotating body, the filament is accelerated as it passes to the body. Accordingly, the spinning speed of the filament, which is the speed of the filament at a point after solidification is substantially complete and attenuation with a reduction in denier of the filament has well-nigh ceased, is directly dependent upon the peripheral speed of the rotating body. Hence, the spinning speed of the filament can be controlled in a direct and effective manner. Filaments of certain polymeric materials, particularly filaments derived from synthetic organic polymeric materials such, for example, as polyamides, polyesters, polyhydrocarbons, polyurethanes, polycarbonates and the like, are macromolecularly oriented as well as attenuated and accelerated by the rotating body. The degree of orientation developed in the freshly spun filaments is related to the peripheral rotational speed in the sense that the greater the speed, up to a certain variable limit, the more effective the orientation. Consequently, when synthetic organic polymeric materials are utilized in this invention, spinning and drawing can be accomplished in a single operation, and the wrapping component derived from the sleeve withdrawn from the rotating body will contain drawn continuous filaments.

The effect of different peripheral speeds on the attenuation, acceleration and, where appropriate, macromolecular orientation, of filaments passing to the body, will be more fully described at a later passage in this specification but, we point out at this stage, that peripheral speeds of less than 7,000 feet per minute are generally associated with yarns of somewhat inferior properties to those which are obtained using bodies with a higher speed, and the spinning speed of the filaments is correspondingly low thereby resulting in a generally poor productivity.

As the traverse mechanism, there may be employed any device capable of imparting to the travelling filament a reciprocating, to-and-fro motion in a manner which spreads the filament along the rotating body in a series of superimposed and interconnected helices. Particularly suitable traverse mechanisms are those wherein the filament passes through a thread guide contained in a traverse bar to which a reciprocating movement is imparted by mechanical, hydraulic, electromagnetic or other suitable means.

The desirably high peripheral speeds for the rotating body impose a lower limit on the traverse speed consistent with the satisfactory operation of the process and the formation of a yarn with good properties. This lower limit for the traverse speed varies over a wide range in dependence upon a number of variable factors, including the peripheral speed of the rotating body. It is preferred to use traverse speeds which are high relative to those normally employed in the winding of continuous filaments into packages in a continuous filament spinning machine. In the latter role, the traverse speed does not ordinarily exceed much above 500 cycles per minute. In contrast thereto, the traverse speeds which, in this invention, are conducive to the smooth operation of the process and the formation of a yarn with maximum utility, are generally over 600 cycles per minute and preferably over 1,000 cycles per minute, when the traverse mechanism are used in conjunction with rotating bodies having peripheral speeds between 7,000 and 20,000 feet per minute.

The invention is further illustrated by reference to the accompanying drawings wherein:

FIGURE 7 shows one form of traverse mechanism which may be used in the apparatus assemblies of FIGURES 1–3.

FIGURE 8 shows an alternative traverse mechanism which may be used in the apparatus assemblies of FIGURES 1–3;

FIGURE 9 is a diagrammatic representation of the configuration adopted by a filament when wrapped as a layer around the rotatable body;

FIGURE 10 is a developed plan of the configuration shown in the previous figure;

FIGURES 11–14 are diagrammatic and essentially idealised views which illustrate the structure of the sleeve which is built up around the rotatable body, and the relationship between various layers therein both on the body and as the sleeve is withdrawn endwise therefrom;

FIGURES 15–16 are diagrammatic views illustrating in more detail, and in a somewhat idealised manner, the relationship between two layers of the sleeve in the region where the sleeve is moving off the rotatable body;

FIGURES 17–18 are diagrammatic views at a greatly enlarged scale of a section of a voluminous hollow web derived from the sleeve after it has moved off the rotatable body, and they illustrate the relationship between the various loops of which the hollow web is comprised and the structure of the individual loops;

Figure 1:
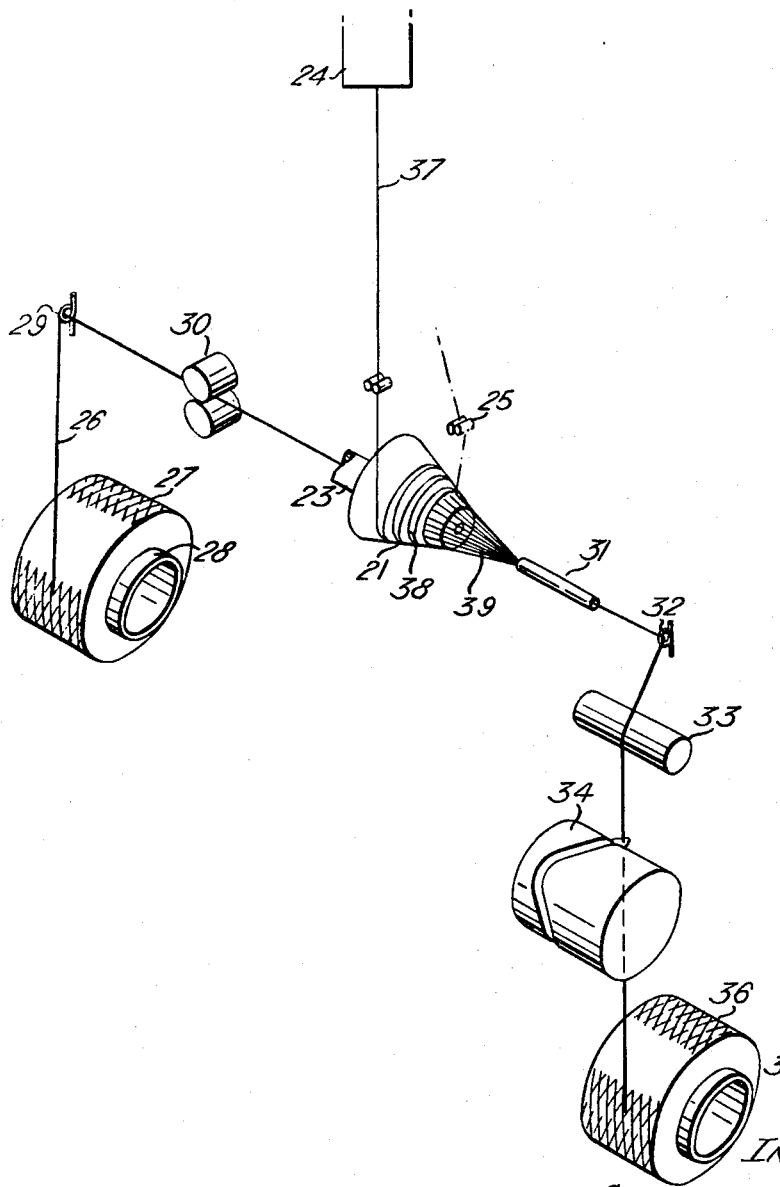
FIGURE 1 is a schematic view in perspective with principal parts in location of an apparatus assembly useful in practicing this invention.
Figure 2:
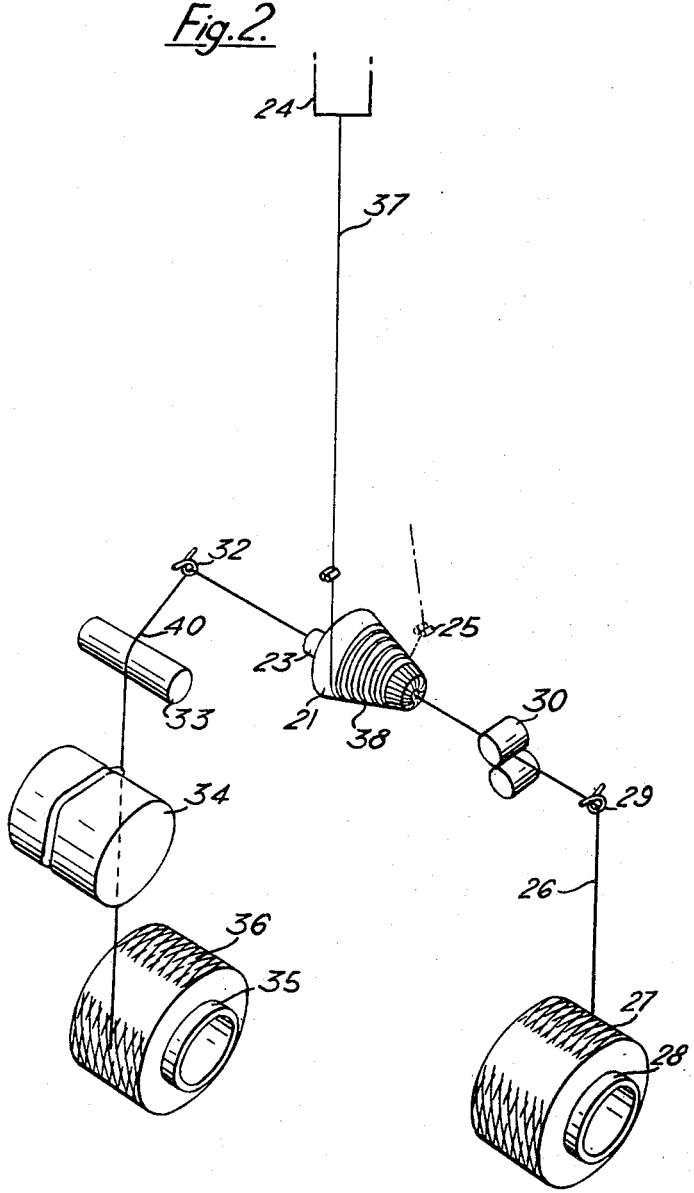
FIGURE 2 is a view similar to that of FIGURE 1 showing an apparatus assembly comprising essentially the same parts as present in the assembly of that figure, but with some of these parts located differently to take account of a different procedure used in practicing the process of the invention.
Figure 3:
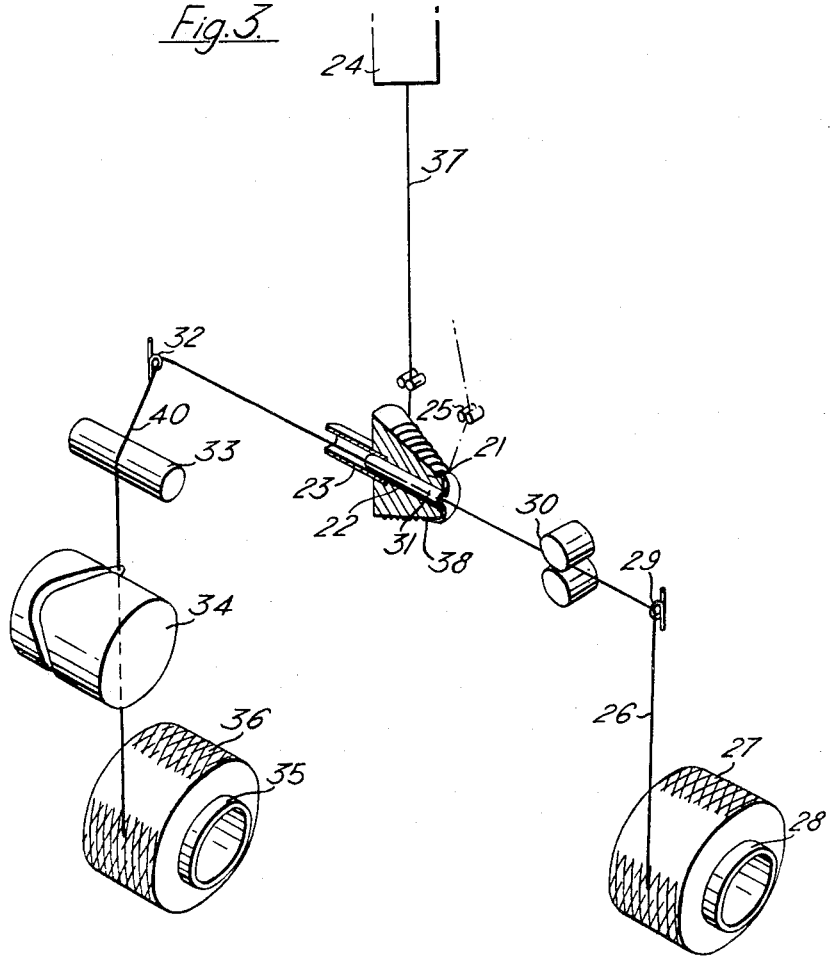
FIGURE 3 is a different view, showing the rotating body in section, of the apparatus assembly of FIGURE 2.

Referring to FIGURES 1–3, the apparatus assembly shown includes, as the rotating hollow body, hereinafter for convenience referred to as a godet, a truncated cone 21 which contains an axially-extending passage 22, and is provided with an integral hollow shaft 23, the bore of which is coaxial with the passage 22. The shaft is attached to a suitable drive mechanism (not shown) of any desired type, which serves to rotate the godet at a controlled speed. In many instances, the drive mechanism is an electric motor. The wrapping component is derived from one (or more) continuous filament initially collected around the godet following its extrusion through an orifice in a spinneret 24. A traverse mechanism 25 is positioned a short distance above with the godet surface with the thread guide (not shown) thereof located in the path of the travelling filament. A package 27 is the source of the core strand, and a pair of co-operating forwarding rolls 30 located between the godet 21 and a pigtail guide 29, provide more definite control over the tension of the core strand, and assist in supplying it at a predetermined delivery speed. The rolls have parallel axis and engaging each other in operation so that slippage or free-flight of the strand therebetween is prevented or reduced.

It is sometimes advantageous, as previously indicated, to include in the apparatus assembly, a guide member, say a stationary tube, with its inlet orifice within, or in spaced proximate relation to the godet. FIGURE 1 and FIGURE 3 illustrate an approximate satisfactory location for such a tube, in those instances where it may be desirable to incorporate a tube, as a guide member, in the apparatus assembly. In the apparatus assembly of FIGURE 1 the tube 31 is located along the axis of revolution of the godet with the inlet orifice thereof in spaced proximate relation to the godet nose. In the apparatus assembly of FIGURE 2, the tube 31 is positioned largely within the axially-extending passage 22 and the integral hollow shaft 23 with its inlet orifice located at, or close to, the forward end of the passage.

The wind-up device located beyond a freely rotatable guide roll 33 and a pigtail guide 32, is a conventional winder having a drum traverse 34 and a holder 35 on which a yarn package is built.

The operation of the apparatus assembly in the practice of the process of this invention is readily understood by reference to FIGURE 1 and FIGURES 2–3. In the derivation of the wrapping component, a sleeve 38 comprising overlaid and interconnected helices is continuously propagated around the godet 21 in the following manner.

A freshly formed continuous filament indicated by reference numeral 37, is spun from the spinneret 24 into room temperature air. The extruded filament after cooling and solidifying in the course of its downward passage through the air is wrapped around the continuous surface of the godet 21. The peripheral speed i.e. surface speed of the godet is arranged to be sufficiently high to enable it to apply tension to the filament and thereby to attenuate it during its passage between the spinneret and the godet. The continuous filament during its downward travel is passed through the thread guide (not shown) of the traverse mechanism 25 which is located a short distance above the godet surface. This traverse mechanism imparts to the downwardly travelling filament a reciprocating, to-and-fro movement in a plane normal to the mean direction of filament travel and parallel to the longitudinal axis of the godet 21. As a result of the reciprocating movement which is imparted to it, the filament is wound back and forth across the surface of the godet, from the skirt to the nose thereof, as a series of interconnected helices, which accumulate thereon in the form of the tapered tubular sleeve 38.

Simultaneously with the continuous propagation of this sleeve, a core strand 26 is passed, under a suitable tension, through the axially-extending passage 22 in the godet, following its withdrawal from the package 27, over and around one end of the bobbin 28, or like holder, such as a pirn or cone, and then through the pigtail guide 29 and the forwarding rolls 30.

With the core strand 26 suitably tensioned between the forwarding rolls 30 and the wind-up device, the sleeve 38 is pulled down from the inclined surface of the godet 21 and withdrawn endwise therefrom so as to envelope the core strand which is thereby introduced within the withdrawn sleeve. The procedure involved in effecting the introduction of the core strand depends upon which apparatus assembly is employed. When that shown in FIGURE 1 is used, the sleeve 38, after it leaves the godet surface, is moved away in the same direction as that in which it was initially moved forward down the godet surface, into association with the core strand 26 which is likewise advanced in that direction. The sleeve, between the nose of the godet and the region of its association with the core strand, collapses owing to loss of the support of the godet surface, and is elongated in an essentially axial direction under the influence of the tractive effect exerted by the core strand so forming a voluminous, cone-shaped hollow web 39, comprising serially-connected complex loops, enveloping the core strand 26. When the apparatus assembly of FIGURES 2–3 is employed, the sleeve 38, after it leaves the godet surface, is moved in the opposite direction through the axially-extending passage 22, into association with the core strand 26 which is likewise advanced in that direction.

The reversal of the direction of forward movement which occurs more or less simultaneously with the removal of the sleeve from the surface of the godet, effects evertion of the sleeve. Arising from the evertion of the sleeve, any relatively short length loops projecting outwardly from the main mass thereof when on the godet, and which are formed primarily by the action of the centrifugal force on loosely wrapped turns of the helices, are transferred from the periphery to the interior.

As with the apparatus assembly of FIGURE 1, the removal of the sleeve from the surface of the godet and its movement down the passage is associated not only with its evertion, but its collapse, owing to the loss of the support of the godet surface, and its elongation in an essentially axial direction, under the influence of the tractive effect everted by the core strand. The summation of these two effects provides a voluminous, hollow web of interconnected complex which envelopes the core strand.

Whichever procedure is adopted in introducing the core strand into the voluminous hollow web, the latter, on association with the core strand, because of the rotary movement of the godet, is twisted down around the core strand, so that it condenses into a relatively tight wrapping conforming to the contours of the core strand. Hence, the godet serves both to collect the freshly formed continuous filament as a sleeve of overlaid and interconnected helices which serves as the precursor of the wrapping component, and to spin the voluminous hollow web, constituting the wrapping component, which is derived therefrom, relatively tightly around the surface of the core strand in the form of a continuous, approximately tubular sheath. The condensation of the voluminous web into a relatively tight, approximately tubular sheath may, in some instances, be assisted, and a superior product obtained, by passing the composite structure comprising the core strand and the enveloping web through the stationary tube 31, which localises the region of association between the two components and constricts, through frictional contact, the web.

The resulting core yarn 40 after being passed through the pigtail guide 32 and around the freely rotatable guide roll 33 is collected, using a drum traverse 34, on a holder 35, to form a package 36.

The godet around which the filament is wrapped as a sleeve and which applies tension to the filament thereby continuously pulling it down onto itself at a speed which is faster than the extrusion speed, is usually profiled so as to slope downwards to the end over which the sleeve is withdrawn, for then its orderly removal as a coherent, integrated structure is facilitated.

Figure 4:
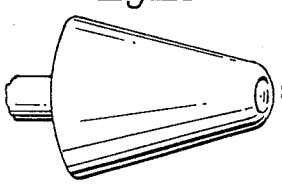
FIGURES 4–6 are perspective views of different rotating bodies which may be used in the apparatus assemblies of FIGURES 1–3.
Figure 5:
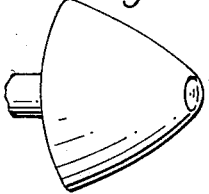
Figure 6:
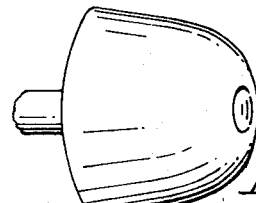

FIGURES 4–6 shown perspective representations of actual godets that have been successfully used in this invention in the apparatus assemblies shown in FIGURES 1–3.

Each of the godets is a hollow lightweight construction with a continuous surface and is made of a high tensile strength aluminium alloy with an axially-extending passage, the bore of which is adequate to accommodate the composite structure when the godet is employed in the apparatus assembly of FIGURES 2–3.

The hollow shaft, which has an internal diameter of ½ inch is integral with the godet and serves to attach it to a suitable drive means conveniently an electric motor, by means of which the godet is rotated.

The frusto-conical godet of FIGURE 4 has the following dimensions:

| | | |
|---|---|---|
| Maximum diameter | inches | 3¼ |
| Minimum diameter | do | 1¼ |
| Length along passage | do | 3⅛ |
| Angle of declination | degree | 19 |
| Internal diameter of axially-ending passage | inch | ½ |

The bullet nose godet of FIGURE 5 has the following dimensions:

| | | |
|---|---|---|
| Maximum diameter | inches | 3 |
| Minimum diameter | do | 1⅛ |
| Length along passage | do | 2 |
| Angle of declination | degree | 30 |
| Internal diameter of passage | inch | ½ |

The slightly tapered essentially cylindrical godet of FIGURE 6 has the following dimensions:

| | | |
|---|---|---|
| Maximum diameter | inches | 2⅞ |
| Minimum diameter | do | 2⅜ |
| Length along axis | do | 1½ |
| Angle of declination | degree | 4 |
| Internal diameter of passage | inch | ½ |

The directional location of the godet relative to the spinneret is not critical and the process can be operated with the godet positioned on the same vertical line as the godet or off-set therefrom.

In terms of distance from the spinneret, the godet should be located beyond the point where the downwardly travelling filament has substantially completely solidified, otherwise the disruption of the filament into discontinuous staple length fibres may occur when the filament contacts the godet, and when more filaments than one are being pulled down onto the godet fusion between adjacent filaments may result because of inadequate quenching time. In the particular case of filaments derived from melt-spun polymers, for instance, synthetic organic polymers, such as polyamides, polyesters, polyhydrocarbons, polycarbonates and the like, the godet should be located beyond the region along the length of the extruded filament wherein the solidfying filament is in a highly transitional plastic state between the liquid and the solid states. Attenuation of the filament is effected predominantly in this region, for the stress imposed by the godet carries back along the filament and localises the attenuation in that region. In this transitional region the filament can be seen to accelerate and become taut, moving along its length at high speeds. The optimum location for the godet is determined by simple experiments which involve altering its position until it attenuates the filament well but does not disrupt it, or cause the filaments to fuse together. In the case of polyhexamethylene adipamide, polyethylene trephthalate and polypropylene filaments the godet may be positioned anywhere between 18 inches and 10 feet beneath the spinneret face.

When operating with filaments derived from synthetic organic polymers, such as the polymer species listed hereinbefore, the peripheral speed of the godet should be sufficiently high to macromolecularly orient the filaments as well as to attenuate them.

The peripheral speed required to attenuate and orient the filaments to the desired extent, which speed is related to the design characteristics of the godet, its dimensions and speed of rotation, will vary according to the polymer being spun and process conditions, such as emergent viscosity of the polymer, i.e., the melt viscosity at the time of extrusion, the rate of the extrusion and the linear distance between the spinneret face and the godet.

With respect to polyhexamethylene adipamide, polyethylene terephthalate and polypropylene filaments a reasonable degree of macromolecular orientation, as evinced by birefringence measurements and properties such as tenacity and extensibility, can be attained at peripheral speeds over 7,000 feet per minute. Peripheral speeds of below 7,000 feet per minute result in low tenacity filaments of limited utility. Above 7,000 feet per minute, the peripheral speed can be increased until excessive filament breakage occurs. The maximum peripheral speed which can be utilised without excessive filament breakage is primarily set by the extrusion rate. When excessive filament breakage at the spinneret occurs at a particular peripheral speed, then this can be minimised and the peripheral speed rendered practicable by using higher extrusion rates.

The better developed macromolecular orientation resulting from the higher peripheral speeds is associated with a decrease in the filament denier and consequently, a compromise has to be reached between orientation and filament denier. With polymers such as polyhexamethylene adipamide, polyethyleneterephthalate and polypropylene, peripheral speeds of 9,000–10,000 feet per minute result in filament deniers of between 1.2–6 depending primarily upon the extrusion rate. Since filaments having a denier of less than 1 are not of great utility, this denier reduction also imposes an upper limit on the peripheral speed of the godet.

High peripheral speeds for the godet, although essential for the most satisfactory operation of the process when melt-spun macromolecularly orientable synthetic organic polymers are used as the filament source, are also advantageously employed with other polymeric materials. This is so, because of the equivalency between the peripheral speed and spinning speed. Hence, high peripheral speeds are associated with enhanced productivity of the wrapping component and the attainment of an economically favourable wrapping process.

Since the peripheral speed of the godet is determined by its dimensions, in particular its diameter in the region where the filament is lead around the godet, and its rotational speed, a given peripheral speed can be attained either by rotating a relatively small godet at a comparatively high speed, or by rotating, at a slower speed, a larger body. An example will make this clear. Consider the godet shown in FIGURE 6. At a rotational speed of 20,000 revolutions per minute, its peripheral speed at the skirt where its diameter is 2⅞ inches is approximately 15,000 feet per minute. An equivalent peripheral speed could be obtained using a godet of a similar cylindrical shape, but having a diameter of 6 inches, by rotating it at 9,500 revolutions per minute. The use of a relatively large godet to attain a high peripheral speed is associated with certain difficulties. For instance, as the length of the axially-extending loops in the sheath is directly related to the length of the filament laid around, and along, the godet in a single traverse, the yarn which is derived from the sleeve withdrawn from a large godet (large length and/or large diameter) tends to contain long loops and this has a deleterious effect upon the structure of the yarn and the structure of the yarn and the properties possessed by it. Furthermore, difficulties may be experienced in withdrawing the sleeve from the godet in an orderly and progressive manner. Additionally, a large body will have a lower bursting speed, and it will occupy a greater amount of the limited space beneath a spinning station than a smaller body.

For these, and other reasons, it is preferred to obtain the desired high peripheral speeds by the rotation of a relatively small godet at a high speed. The use of high rotational speeds for the godet is also advantageous in a manner which will be explained more fully hereinafter, in twisting the voluminous bundle of loops around the core strand to provide a relatively tight, approximately tubular sheath.

By way of affording a more comprehensive appreciation of the expression "relatively small godet" there has been detailed herein the dimensions of the godets shown in FIGURES 4–6.

The rotation of these godets at 18,000 r.p.m. gives peripheral rotational speeds at the skirt of 15,290, 14,130 and 13,570 feet per minute respectively, and this is sufficient when melt-spun synthetic organic polymers are being processed to impart a useful degree of macromolecular orientation.

These godets are adequate for the collection, in the form of a sleeve, of up to 25 filaments having deniers of up to six, and the sleeve can readily be withdrawn therefrom in an orderly and progressive manner.

The upper limit on the godet dimensions compatible with the orderly and progressive removal of the sleeve, and the formation of the sheath with the desired structure, depends upon factors such as the godet profile, the rotational speed and the traverse speed, but with godets of a large diameter there is an increasing propensity for "snatching" of the sleeve during its withdrawal; "snatching" results in the formation of a sheath of markedly irregular denier and consequently a core yarn of limited utility, and also the frequent breaking of the filament or filaments with the interruption of the process.

As previously mentioned, the downwardly travelling filament is lead through a traverse mechanism which imparts a reciprocating motion to the filament so as to spread it out over the surface of the godet in the form of a sleeve comprising a series of interconnected and superimposed helices. The traverse mechanism is located a short distance above the godet. If it is positioned too far away from the godet then there is some loss in the effectiveness of the traverse device in spreading the filament over the surface thereof, while, if it is too close to the godet, then difficulties may be encountered in stringing-up the apparatus. The optimum location for the traverse mechanism is determined by shifting it away from the godet until stringing-up of the apparatus can be effected without difficulty. When operating with traverse mechanism of the type wherein the filament is passed through a thread guide contained in a traverse bar reciprocated by mechanical, hydraulic, electromagnetic or other similar means, and using the godet shown in FIGURES 4–6, this optimum distance is between 1 and 6 inches above the godet, and most commonly 1.5 to 4 inches above it.

For the most satisfactory operation of the process of this invention, it is desirable that the traverse mechanism should have a traverse speed which is high relative to the traverse speeds ordinarily employed in the winding of continuous filaments into packages in a continuous filament spinning machine. One traverse device which can move the filament back and forth along the godet at high speed, and that is suitable for use in the apparatus assembly of FIGURE 1 or FIGURES 2–3, is shown in plan view in FIGURE 7.

Referring to that figure, the traverse mechanism comprises a thin metal traverse bar 50, one end 51 of which is clamped to an end of a U-shaped iron block 52 and the other end 53 carries a light two-pronged filament guide 54 constructed of two, 1/16 inch diameter and 1/2 inch long, ceramic pins. The iron block 52 serves as the core of an electromagnet, indicated generally by reference numeral 55, and the nexus 56 thereof is surrounded by a wire wound into a coil 57 which is connected through a variable transformer to a source (neither of which are shown) delivering fifty cycles of alternating current per second. A silicon diode rectifier 58 is connected in series with the coil of the electromagnet so as to pass only alternate half cycles of current. The flux induced in the iron core 52 imparts a reciprocating motion to the cantilever traverse bar 50 which is tuned to move back and forward at the desired speed of fifty cycles per second by adjustment of its free length. The traverse is sinusoidal in character with an amplitude (peak-peak) of approximately 1.5 inches.

FIGURE 8 shows an alternative high speed traverse mechanism, which is mechanical rather than electrical in operation, and that may be used in the apparatus assembly of FIGURE 1 or FIGURES 2–3.

In its essential form, this traverse mechanism comprises an arrangement for converting the rotary motion of a crank into rectilinear movement, the latter operating on a traverse bar via a connecting rod, and it utilises a Scotch yoke to eliminate the irregularity of motion, common to all ordinary crank devices. Referring to the figure, the filament being passed to the godet is carried through a ceramic thread guide 60 attached to one end of a light tubular steel traverse bar 61 which is pivotally connected at its other end to a bracket 44. The traverse bar is also secured to a connecting rod 63 by a pin 64 which can move in a longitudinal slot 65 in the traverse bar. It will be apparent from an inspection of the figure, that if the connecting rod is reciprocated, a like motion will be imparted to the traverse bar. To secure the reciprocating action, the connecting rod is rigidly secured to a cross-head 66, which contains a slot 67 within which there is located a slidable block 68. The block is connected through a crank pin 69 to a crank 70 attached to one end of an axle 71 which is rotated at a uniform speed by an electric motor controlled by a variac transformer (neither of which are shown). Thus, by means of the rotating crank, a continuous reciprocating motion is transmitted through the connecting rod to the traversing bar which, in moving back and forth, describes an arc. On account of its simplicity, this traverse mechanism is reliable in operation, and is capable of attaining traverse speeds of up to about 100 cycles per second. The traverse is essentially sinusoidal in character, and its speed can readily be altered and the amplitude adjusted, the latter in accordance with the length of the godet along which the filament is to be wrapped.

In operation, the traverse bar (50 or 61) in the mechanisms shown in FIGURES 7 and 8, is positioned in a horizontal plane essentially at right angles to the long axis of the godet so that the filament passing through the thread guide is traversed back and forth along the length of the godet.

Traverse mechanism other than the two shown may be employed, and it is not necessary that the reciprocating movement be imparted to the filament by its passage through a thread guide contained in a displaceable traverse bar. For instance, the traverse mechanism may be pneumatic in operation, with the filament passing through a zone wherein it is subjected to a transverse stream of air, the direction of which is rapidly and continuously alternated.

A similar effect may be obtained electrostatically by passing the filament between two plates the polarity of which is rapidly and continuously reversed.

Due to the axial movement imparted to the filament by the traverse mechanism, and also the rotary movement of the godet, the filament is wrapped around the godet in a series of interconnected and superimposed helices which form an approximately tubular sleeve around the godet.

FIGURE 9 is a diagrammatic representation of the configuration adopted by a filament wrapped around the godet in one complete traverse cycle. Initially, the filament advances along the godet in one direction as a right-hand helix 72. At the point X, which corresponds to the extreme right-hand end of the traverse cycle, there is a reversal of the direction in which the filament moves along the godet, and a second helix 73, in this instance a left-hand helix, which overlies the first helix, is formed. Both helices contain the same number of turns and are of the same length, which approximately corresponds to the traverse amplitude. The structure derived from a single complete traverse comprises the two interconnected and superimposed helices, 72 and 73, of opposite hand, although they were generated in the same rotational direction. This double helical structure constitutes one layer of the sleeve which is built up on the godet and for convenience in this specification the term "layer" will be used in reference to the double helical structure formed from one complete traverse.

A layer, when projected onto a plane surface, as in the developed plan shown in FIGURE 10, describes a series of linked curves, the configuration of which is similar to certain kinds of Lissajous figures known in mathematics. The configuration of the filament within a layer is reflected in the structure of the axially-extending complex loops in the sheath as will be explained in more detail hereinafter.

The characteristic structure of the sheath surrounding the core yarns of this invention and the properties manifest by it, are dependent upon the formation on the godet of a transient assembly in the form of a sleeve constructed of a plurality of layers each derived from a single traverse, the orderly and progressive withdrawal of the sleeve from the godet, and the relatively tight wrapping of the withdrawn sleeve around a continuously advancing core strand introduced therein.

When the advantageous high peripheral speeds are employed for the godet, the formation of such a sleeve, assuming that there is the usual slow withdrawal speed, is dependent upon a high speed of traverse in the traverse mechanism.

Moreover, the helical angle of the turns within a layer is determined by the peripheral speed of the godet, the godet profile and the traverse speed at which the traverse mechanism operates, and a high traverse speed is reflected in a relatively large helical angle. When using the traverse mechanism of FIGURE 8 with a traverse speed of 80 cycles per second and the godet of FIGURE 6 with a peripheral speed of 15,000 feet per minute, the filaments at the mid-point of the traverse cross at an angle of around 18°.

A high value for the helical angle enhances the frictional interaction between successive layers and between the two helices of the same layer and aligns the turns of the helix into positions more suitable for withdrawal.

The minimum traverse speed compatible with the formation of a satisfactory sheath, and the smooth operation of the process depends on the design characteristic of the godet, its dimensions, its peripheral speed, the speed at which the sleeve is withdrawn from the godet and like variable factors. In respect to the traverse mechanisms of FIGURES 7 and 8 when used with the godets shown in FIGURES 4–6 and other godets of similar dimensions operating at peripheral speeds of between 7,000 and 20,000 feet per minute, and with the sleeve being withdrawn at a rate of up to 500 feet per minute, the traverse speed can be varied over a wide range above 600 cycles per minute, preferably above 1,000 cycles per minute. Traverse speeds below 600 cycles per minute are associated with frequent breakdowns in the process and result in a sheath with a markedly irregular denier and consequently, a core yarn of limited utility. With peripheral speeds of less than 7,000 feet per minute, the traverse speed can be correspondingly less than 600 cycles per minute and still produce a reasonably uniform sheath of good properties.

To obtain a sheath with the desired structure from the approximately tubular sleeve which forms around the godet, it is necessary, as a first step, progressively to remove layers from within the sleeve. This is accomplished by a pulling action imparted to the sleeve as a result of the association between the withdrawn structure and the continuously advancing core strand. This pulling action engenders the movement of the sleeve down the inclined surface of the godet and away therefrom, either in the same direction as that of its initial forward movement, or in the reverse direction through the axially-extending passage into association with the core strand. Layers within the sleeve are generally moved away in the order in which they were assembled around the godet. However, because of the good frictional interaction and coherency between adjacent layers, attributable to the high traverse speeds employed, a tractive effect is exerted by a given layer, as it moves, on successive layers so that the entire sleeve advances down the inclined surface of the godet, and into association with the core strand, as an integrated structure. When the direction of forward movement is reversed during the withdrawal of the layers, with the layers being moved along the axially-extending passage, then evertion of the layers is a concomitant thereto. Since the sleeve moves as an integrated structure, this evertion is effected in a controlled manner. The sleeve is essentially a transient assembly for, although it is continuously propagated by the deposition of additional layers around its outer surface, it is continuously and simultaneously diminished by the withdrawal of layers from the interior thereof. Once the withdrawal of layers has been commenced, and provided a constant speed of withdrawal, i.e. core strand speed, is maintained, an equilibrium state is attained between the accumulation of layers within the sleeve and their withdrawal as the wrapping component. The sleeve present on the godet after the commencement of the withdrawal of layers comprises a plurality of layers arranged in a superimposed array but with successive layers disposed in a staggered relationship to one another.

Figure 11:
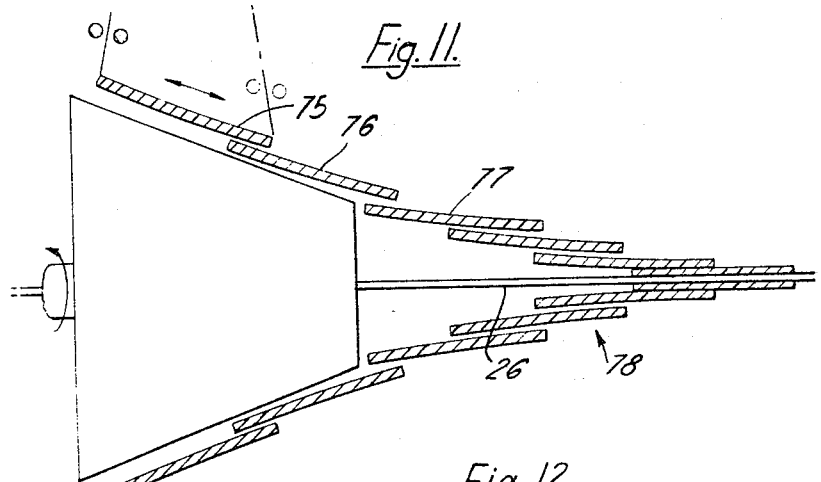
Figure 12:
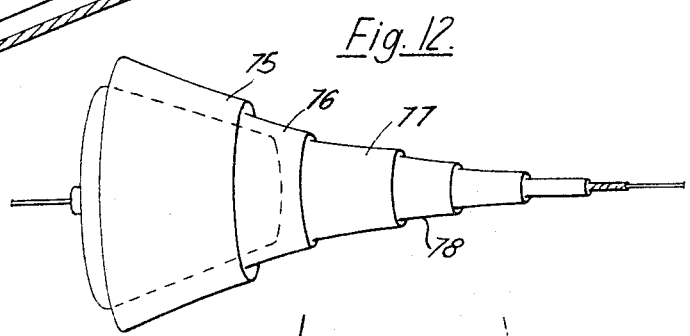

FIGURES 11 and 12 show in a diagrammatic and idealised manner, the relationship between successive linked layers on the godet and they illustrate phenomena which occur during the movement of the sleeve from the godet and its movement away from the godet along the axis of revolution, and its association with the core strand.

Figure 13:
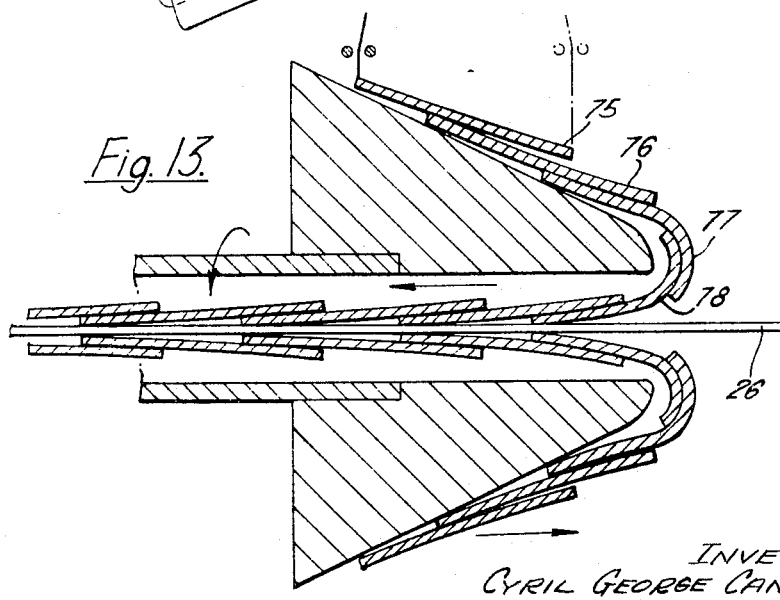

FIGURES 13 and 14 are comparable illustrations when the sleeve, instead of being moved away from the godet along the axis of revolution, is everted and moved down the axially-extending passage (as in the apparatus assembly of FIGURES 2–3).

In the diagrammatic cross-sectional views of FIGURES 11 and 13, a newly deposited layer 75 overlaps the layer 76 deposited immediately previously but which, in the interval of the time after its formation, has moved down the inclined surface of the godet under the tractive effect exerted by layer 77 which has moved completely off the godet surface in FIGURE 11 and partially in FIGURE 13. Referring to the latter figure the forward end of the layer 76 is being pulled around into position for moving down the passage, under the tractive effect exerted by the layer 78 which has moved completely away from the godet surface into association with the core strand 26. Further, the layer 78, because of the reversal of the direction of forward movement, which occurs more or less simultaneously with its movement off the surface, has been turned inside-out. The relatively short length loops, none of which are shown, but which are always present in any layer, and which project outwardly therefrom when it is on the godet surface, are transferred, owing to the evertion, to the interior of the voluminous hollow web enveloping the core strand.

In the cross-section views shown in FIGURES 11 and 13 the sleeve, only a few of the many component layers of which are actually depicted, is a tegulated structure with the interconnected layers arranged on top of one another but with a staggered relationship between layers. As each layer comprises two interconnected, and overlaid helices which are generated around the godet serving as a framework, the actual structure of the sleeve more closely resembles that shown in the side views of FIGURES 12 and 14 with each layer contained for a variable part of its length within the layer assembled immediately after it, and to which it is linked.

Thus, layer 76 is contained for part of its length within layer 75, the two layers being linked through the continuation of a component helix of layer 76, as one of the helices, of opposite hand, in the layer 75. In a similar manner layer 78 is contained for part of its length within the layer 77. An arrangement such as that shown in FIGURES 11–14, makes for good frictional interaction between the overlaid layers, and this assists the removal of the sleeve as an integrated structure with a retention of staggered relationships between successive layers and, when necessary as in FIGURES 13 and 14, its evertion in a controlled manner.

The loss of the support afforded by the godet as a layer moves off its surface, results in a collapse of the serially-connected helices of which it is composed. Simultaneously with their collapse, the helices within a layer are extended in an axial direction under the impetus imparted by the pulling action arising from the impingement, and association, of the withdrawn structure with the continuously advancing core strand. The summation of this axial elongation and collapse of the helices results in the formation of a voluminous hollow web composed essentially of relatively long loops comprising two limbs, each limb being derived from a component helix of the layer, which are interlaced, and thereby stabilised, owing to the limbs crossing one another at a variable number of points along the length of a loop.

Loops of this general type will for convenience be referred to in this description as complex loops, to distinguish them from the generally shorter length loops, usually of a less complex character, which are always present and which, in those instances when the sleeve is everted, are transferred from the periphery to the interior of the voluminous hollow web serving as the wrapping component.

FIGURE 15 illustrates the structure of the layers assembled around the godet, the relationship between two layers, and the collapse of one of them as it moves off the godet away therefrom along the axis of revolution, and its elongation into a loop which constitutes an axially-extending loop in the resulting sheath of the core yarn.

FIGURE 16 is a comparable illustration applicable in those instances when the sleeve is everted simultaneously with its withdrawal, and moved away through the axially-extending passage.

Referring to these figures, a newly deposited layer 80 comprises two helices 81 and 82, spread out over the length of the godet with the left-hand helix 82 overlying the right-hand helix 81 and the helices serially-connected at the extreme left-hand end of the godet through the common chord 83 which constitutes the trailing end of layer 80.

Each of the helices contains five turns and two turns 84 and 85 at the forward end of the first laid helix 81 have moved off the godet under the influence of the tractive effect exerted by the layer 87 deposited on the godet immediately previously to the layer 80.

The layer 80 is connected at its leading end 86 to the layer 87. The layer 87 which likewise comprises two serially connected, five turn helices, has, except for the trailing end, entirely moved off the retaining surface of the godet and, in the arrangement shown in FIGURE 16, into the passage within the godet, as a result of which it is turned inside-out. Whether or not its withdrawal is accompanied by eversion the layer collapses in the vertical direction, and is elongated in the longitudinal direction, thereby forming a long loop with interlaced limbs owing to the intercrossing of the limbs which occurs at nodal points (five in number) which correspond to the points in the initial layer, where one helix crossed over the other.

In FIGURE 16, the trailing end of the layer 87 projects outwardly from the godet surface, as a relatively short length loop 88. This short-length loop is derived from the action of the centrifugal force, arising from the rotation of the godet, on a loosely-wrapped individual turn of a helix in the layer 87. On the eversion of the layer, this loop 88 will be transferred to the interior, and will occupy an approximately central position in the voluminous hollow web aligned essentially parallel to the long axis thereof. Two such aligned loops, which at an earlier stage projected outwardly from the godet surface, are indicated by reference numeral 89, this loop incorporating the leading end 86 of the layer 80, and reference numeral 90, this loop being derived from a turn of the outer helix of the layer 87. These projecting loops are always present in the sleeve and, although even in those instances wherein the wrapping component is derived from a sleeve without its eversion (FIGURE 15), the resulting sheath contains predominantly axially-extending loops, whether complex or short-length, twisted around the core strand, eversion does ensure that these initially projecting loops are embedded in the sheath. The transfer of these short length loops from the periphery of the sleeve to the interior of the sheath is sometimes reflected in an improved handle or feel, and an enhanced uniformity of denier.

It will be appreciated that FIGURES 11–16 are diagrammatic and somewhat idealistic for, in actual operation, the sleeve built up on the godet normally contains many more layers, and having regard to their number, the fineness of the filaments, and the speeds involved, it is impossible to determine with complete accuracy, or to record the structure of the sleeve, and the complex series of events which occur during its withdrawal.

However, high speed photographs and experiments with model systems, whilst highlighting the complexity, verify the essential validity of the analysis of the sleeve structure, and the explanation of the phenomena occurring during its withdrawal, and, where appropriate, its eversion which is provided hereinbefore. In particular, these techniques confirm that a plurality of layers accumulate on the godet so as to form a sleeve, that there is a progressive and generally orderly advancement of the sleeve down and off the godet, with the layers moving approximately in the order in which they are deposited with the whole assembly moving as an integrated and coherent structure. Further, they also confirm that the sleeve on moving off the godet surface collapses, and the helices forming the layers thereof are elongated axially into long complex loops. The high speed photographs and the experiments with model systems also confirm that in the eversion, which, where appropriate, occurs more or less simultaneously with the departure of the layers from the godet surface, the outwardly projecting loops are conveyed into the interior of the resulting voluminous hollow web which envelops the core strand.

The removal of the sleeve in an orderly and progressive manner implies that the layers are arranged therein in a superimposed, but staggered relationship, and it is the retention of this arrangement during, and subsequent to, the withdrawal and, where appropriate, eversion which endows the sheath of the core yarns of this invention with its characteristic structure and some of its advantageous properties.

Owing to the rapidity of events, a number of layers will move off the godet surface practically instantaneously, although overall the staggered relationship is maintained, so that the resulting voluminous hollow web which envelops the core strand and which is then twisted around it comprises essentially axially-extending, serially-connected loops, many of the loops being contained for a variable part of their length within another loop.

FIGURE 17 shows, in a diagrammatic view, at a greatly enlarged scale, a small section of the hollow web enveloping the centrally disposed core strand 26 which is derived from a sleeve containing layers similar to the two layers shown with reference to FIGURE 15. FIGURE 18 is a comparable view of the hollow web derived from a sleeve containing layers similar to the two layers shown with reference to FIGURE 16, and which is everted more or less simultaneously with its withdrawal. Both of the structures shown comprise a nest of essentially axially-extending, serially-connected loops, surrounding the centrally disposed core strand 26.

In both structures one loop 92 has its closed end 93 at the extreme left-hand end of the section and extends along it to terminate in its leading end 94. One limb 95 of the loop, because it derives from an underlying helix in the initial layer, extends slightly further forward than the other limb 96 of the loop. The two limbs of this complex loop are interlaced owing to the crossing of limbs which occurs at the five nodal points ($a$–$e$). This interlacing, interlocks the limbs and so stabilises the complex loops, and is attributed to the formation of the loop from a layer which comprises two serially connected over-laid helices of opposite hand. The number of nodal points present corresponds to the number of turns within each helix of the layer.

The retention during, and subsequent to, the withdrawal and eversion, of the superimposed but staggered relationship between layers of the sleeve is reflected in the structure of the hollow web enveloping the core strand 26. Thus, the loop 92 is contained within another axially-extending complex loop 99 derived from the next succeeding layer within the sleeve and the two loops are interconnected through the common chord 100.

The limbs of the loop 99 are interlaced in a similar manner to those for the loop 92. Moreover, loop 92 itself envelopes another complex loop 101, the closed end of 102 of which lies approximately midway along loop 92. This loop also contains within it another complex loop 103, part only of which is shown. The general arrangement in both structures is that of a nest of axially-extending interconnected loops which have a complex structure.

In the event that the hollow web is derived from a sleeve which has been everted more or less simultaneously with its withdrawal, it will contain, within the nest of axially-extending complex loops, a number of short length loops. FIGURE 18 is a diagrammatic illustration of such a hollow web enveloping the centrally disposed core strand 26, and two of these short length loops, disposed in the interior of the web and aligned essentially parallel to the core strand, are indicated by reference numerals 97 and 104.

Initially, that is when the sleeve was on the godet, these loops projected outwardly from the main mass but, on account of the evertion, they have been conveyed to the interior and thereby embedded within the web. Loop 97, the closed end 98 of which extends up to the closed end 93 of the complex loop 92, is derived from the middle turn of the outer helix of the layer in which the loop 92 originated. The limbs of the loop 97 merge at two places with the limb 94 of the complex loop. Loop 104, a length of which, toward it closed end 105, is contained within the loop 97, is derived from the portion of a layer which constitutes the common chord between its component helices and consequently, the limbs of the loop merge with different limbs of the complex loop 92. Both of the loops are shown containing the twist which is inserted therein, as well as in the complex loops, although for clarity the twist present in the complex loops has been omitted, when the layers leave the godet surface.

Loops within the hollow web are rarely so uniformly arranged as the diagrammatic illustrations, of FIGURE 17 and 18 would suggest, but despite a certain degree of dislocation and derangement for reasons which will be outlined hereinafter, the configurations adopted by the loops as shown in FIGURES 17 and 18 occur with sufficient constancy to provide cross-section taken at random intervals along the length with approximately the same number of filaments.

As the voluminous hollow web moves into association with the continuously advancing core strand, twist is inserted therein. This twist, which results from the rotation of the body relatively rapidly in relation to the core strand, condenses the web, so that the loops present therein are spun down around the core strand in the form of a relatively tight wrapping.

To localise the association between the voluminous hollow web and the core strand to a fixed region, it may be desirable, as previously mentioned, to pass the composite structure through a guide member, which may, as in the apparatus assembly of FIGURES 1–3, be a stationary tube. The stationary tube should have a bore with a diameter, or least diameter, of a size such that the loops constituting the web make frictional contact with the internal surface thereof so that the web is constricted, and the wrapping of it around the core strand assisted. The selection of an appropriate diameter to attain this end will depend upon the diameter of the composite structure which is to be passed through the tube, and is best made by carrying out a few simple experiments. As regards a satisfactory location for the tube, which is influenced by a number of factors, it is generally found that some latitude, within limits defined by the function of the tube, is permissible and it is best determined empirically by varying its position along the path which the composite structure takes as moves toward the windup device, and, if necessary, testing the resulting core yarns.

By way of illustrating what, in practice, are found to be satisfactory locations for the stationary tube when one is incorporated, say in the apparatus assembly of FIGURE 1, we mention that the tube may be disposed along the axis of rotation, with the inlet orifice thereof positioned a distance of about 8 mm. to about 30 mm. away from the nose of the godet. When a tube is incorporated in the apparatus assembly of FIGURES 2–3, it may be disposed (partially or entirely) within the axially-extending passage, with the inlet orifice thereof located approximately level with the nose of the godet or within a distance of 35 mm. down the passage.

Figure 19:
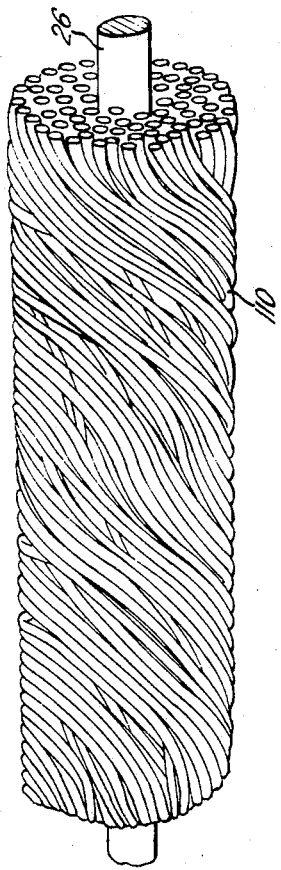
FIGURE 19 is a diagrammatic view of a length of the core yarn made in accordance with this invention as it was observed under the microscope.
Figure 20:
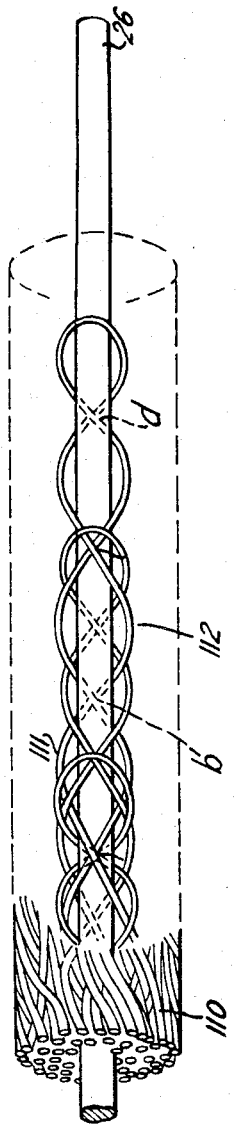
FIGURE 20 is a diagrammatic view similar to that of the previous figure, but with part of the sheath broken away to illustrate in a simplified manner the arrangement of individual serially-connected loops around the core strand.

The core yarn collected as a package by the wind-up device is illustrated in FIGURES 19 and 20. It comprises a centrally disposed core strand 26, and a continuous, approximately tubular sheath 110 surrounding the core strand.

The sheath 110 comprises a concatonation of overlaid serially-connected, predominantly complex loops which are arranged essentially along the main axis of the core yarn with individual loops helically twisted around the core strand in more or less regular helices. In the core yarn shown in FIGURES 19–20, the helical angle is around 70°, but it may vary between different core yarns of this invention, although it is usually in the range 30° to 80°. Component limbs 111 of the complex loops, say loop 112 in FIGURE 20, because of the manner in which the core strand is enveloped by the wrapping component, are interlaced around the core strand, with nodal points (a–d) disposed alternately on one side of the core strand and then the other. Accordingly, the centrally disposed core strand passes through individual complex loops and is enclosed by them. This arrangement provides a fairly uniform, relatively stable sheath, i.e. there is little slippage between it and the core strand, which resists unwrapping from the core strand.

Within the sheath many loops, because of the progressive and orderly manner in which the sleeve is withdrawn from the godet, are arranged so that they are contained for at least part of their length within another loop thereby forming a nest of loops each traversed by the centrally-disposed core strand with a general advancement of loops along the yarn. Loops within the nest are stabilised by the interlacing of component limbs around the core strand. In addition to this nest of loops there is also present a number of loops which are located more or less adjacent the core strand and aligned essentially parallel to the long axis thereof. These centrally disposed loops are derived from loops which, when the sleeve was present on the godet, projected outwardly therefrom. It should be understood that, owing to the complexity of the core structure, it is seldom possible to distinguish between the two kinds of loops of which it is composed, although their presence may be inferred by observation at the stage when the hollow web is being twisted around the core strand.

Furthermore the axial arrangement of the loops within the sheath is more complex than the above description thereof, and, in particular, there is considerable entanglement between adjacent loops which may distort the nest of interconnected loops, although overall the nest arrangement is retained. The overall picture of the sheath is that of an array of interconnected loops, each traversed by the core strand, aligned in a direction essentially parallel to the long axis, although helically twisted in that direction around the core strand.

Cross-sections taken at random along the core yarn show an approximately constant number of "filaments" in the sheath. The number of "filaments" found is related to the linear speed (E) at which the filament(s) are wound around the godet to form a sleeve, their number (N), and the linear speed (W) at which the sheath is withdrawn from the godet. The number can be found by multiplying the ratio E/W by N. The cross-sections often show in addition to the parallel lengths which represent the limbs of loops, the curved end of one or more loops.

A characteristic of the core yarns of this invention is that the approximately tubular sheath which constitutes the wrapping has a high bulk density which is owed to the disposition of the serially-connected helically arranged loops in more or less concentric shells relative to the core strand around which they are wrapped. This arrangement facilitates the tight wrapping of the loops around the core strand so providing the resulting core yarn not only with a high bulk density but also a low bulk factor and good dimensional stability. In numerical terms the wrapping strand in the core yarn of this invention usually has a bulk density in the range of between 0.15 and 1.0 gm./cc., and a bulk factor as herein defined of less than 10 percent.

Further, the arrangement of loops endows the core yarn with a soft handle and feel similar to that associated with a spun staple yarn. Individual loops of which the wrapping strand is composed have lengths varying usually from between half an inch to eighteen inches.

Photomicrographs of lengths of the core yarns in accordance with this invention illustrate the helical disposition of the loops, and their association in an approximately tubular sheath.

The sheath of the core yarns is sufficiently stable without any heat-setting treatment, to resist unwrapping and this stability and coherency is attributed to several factors including the following:

(i) The twisting of the wrapping component, in form of serially-connected loops, around the core strand;

(ii) The location of the core strand actually within many individual complex loops, which, consequently, are "threaded" by the core stand; and (iii) The entanglement between, and the interlocking and snarling of, contiguous loops.

Another factor conferring stability and coherency on the wrapping component in those instances when it is derived from plastic filaments, say plastic polyamide filaments, is the setting of the loops, in the helical configurations around the core strand which occurs conveniently with their transformation into crystalline structures. The transition from the plastic to the crystalline state may occur spontaneously as a result of the exposure of the core yarn to the atmosphere, or it may be induced or accelerated by applying heat or a chemical medium.

As the twist inserted in the bundle of loops from which the sheath is derived, is a function of the rotary movement of the body relative to the linear speed at which the composite structure is moved away by the wind-up device, it is determined by the operating conditions at which the apparatus is employed. Thus, for example, if the filaments are forwarded to the body at a speed of 10,000 feet per minute, and the filament loops are then caused to rotate at 15,000 r.p.m. through rotation of the body, at this speed, before being pulled from the body in association with the core strand and wound-up at a speed of 250 feet per minute, the twist insertion rate is $$\frac{15,000}{250 \times 12} \text{ t.p.i.}$$

or 5 turns per inch.

Hence the amount of twist which is inserted in the sheath, and which imparts thereto a measure of coherency and stability, can be controlled in a simple and effective manner. The optimum twist for best properties in the sheath is dependent upon the denier thereof and the relationship between those two parameters is concisely expressed by means of the twist factor. This is defined (see, for instance, Textiles Terms and Definitions, 4th edition, published by the Textile Institute) as the actual twist divided by the square root of the cotton count which is related to the denier.

In the most satisfactory core yarns of this invention the sheath has a twist factor in the range between ¾ and 20 and most usually between 1 and 16.

The thickness of the sheath, which is related to the twist factor thereof, is commonly such that the sheath is 2–6 times thicker than the core strand.

The apparatus assembly which effects the wrapping of the loops around the core strand is a false twist apparatus, since neither the spinneret nor the package on which the core yarn is wound-up rotate about the yarn axis.

Moreover, as the sheath is constituted by loops helically arranged around the core strand, there must be an average over the length of the core yarn, as many right hand turns of the wrapping component as there are left-hand turns so that the sheath necessarily contains no net real twist. Despite these two factors, the sheath, as indicated previously has the properties which would be expected from a structure containing real twist, most notably its resistance to unwrapping from the core strand and the core yarn is a stable product which can be wound up as a conventional package and stored indefinitely. Consequently, for the purposes of this specification the sheath will be regarded as possessing real twist.

This invention will now be illustrated by the following specific examples which are not to be construed as limiting the scope thereof.

EXAMPLE 1

An apparatus assembly similar to that shown in FIGURE 1, in which the rotating hollow body was the godet shown in FIGURE 4, was used to wrap a plastic polyamide filament, in the form of serially-connected loops, around a 20 denier polyhexamethylene adipamide monofilament core strand. The nylon core strand was drawn off a suitable package, passed through the pigtail guide and the forwarding rolls before traversing the axially-extending passage in the godet (entering at the skirt and departing therefrom at the nose), and then taken to the wind-up device. When the core strand was suitably tensioned, say 10 gms. denier, between the forwarding rolls and the wind-up device, the propagation of the sleeve around the godet, from which the wrapping component was derived, was commenced.

To this end polyhexamethylene adipamide having a relative viscosity of 35 was extruded through 0.009 inch diameter orifices in a spinneret at a rate of 0.05 lb. per hour per orifice at a spinning temperature measured at the spinneret of 273° C. into ambient air at 20° C., and 55 percent relative humidity.

One of those filaments was passed through the filament guide in the sinusoidal traverse mechanism shown in FIGURE 7 which operated at a frequency of 50 cycles per second and had an amplitude of 1.5 inches, and then wound around the frusto-conical shaped godet having the same dimensions as the godet shown in FIGURE 4. The godet, which was driven by an electric motor at a speed of 18,000 r.p.m. giving a peripheral speed of 9,200 feet per minute was located 26 inches below the spinneret face and 2 inches below the traverse mechanism. The filament was wrapped around the godet in the form of a succession of layers each of which, in this particular example, had the form illustrated in FIGURE 9, namely two serially connected helices, laid in opposite directions over a length of 1½ inches of the godet surface, with one overlapping the other. Each helix contained 3 turns of the filament so that 6 turns were laid for a complete traverse. The diameter of the resulting tapered tubular sleeve was 2.5 inches at its widest part and 1.9 inches at its narrowest.

Although the peripheral speed of the godet varied as the filament traversed the one and a half inches along its length in the direction from the skirt to the nose, we found that the denier and birefringence of the filament so traversed was substantially constant at all points along the laid length.

The lack of cyclic variations in denier and birefringence of the filaments wound onto the godet, is probably explained on the basis, that the fluctuations from maximum to minimum peripheral speed along the godet take place so rapidly that they are evened out by the inherent elasticity of the supply filament and do not affect the attenuation and orientation which are predominantly localised in the region where the filament is in a highly transitional plastic state. The birefringence measurements showed that the filament wound on the godet was reasonably well oriented.

To initiate wrapping, the operator withdrew, by pulling, the sleeeve endwise from the godet, and moved it away therefrom, in the same direction as the continuously advancing core strand into association with that strand. Concurrently with its movement off, and away from, the godet, the sleeve collapsed and extended into a voluminous hollow web enveloping the core strand. The association between the web and the core strand was accompanied by the spinning of the former, because of the rotary movement of the godet, around the core strand to form a relatively tight, approximately tubular sheath. The tractive effect exerted on the web by the core strand, ensured that the withdrawal of the sleeve, once commenced, was autogenous. To localise the region of association between the two components, and to assist the condensation of the hollow web around the core strand a two inch long, ½ inch diameter, stationary metal tube was located along the axis of revolution of the godet, with its inlet orifice about 30 mm. away from the nose. The composite structure comprising the core strand and the enveloping hollow web was passed through this tube, and the frictional contact between it and the web helped to spin the web down around the core strand.

The resulting core yarn after being passed through a pigtail guide, and around a freely rotatable guide roll, was collected at a speed of 100 feet per minute, using a drum traverse, on a holder, to form a package.

The core yarn, which comprised an approximately tubular sheath completely surrounding a core strand, had the following properties:

| | |
|---|---|
| Total denier | 122 |
| Denier regularity (percent mean deviation) | 18.2 |
| Tenacity (gms./den.) | 1.42 |
| Extensibility (percent) | 27.3 |
| Sheath denier | 102 |
| Twist level (t.p.i.) | 15 |
| Twist factor (sheath) | 2.1 |
| Bulk density (sheath) | 0.25 |
| Bulk factor (percent) | 1.82 |

The denier regularity of this core yarn, and the core yarns of the other examples, was measured using a Fielden-Walker Yarn Irregularity Tester.

The filament, which in the form of serially-connected loops, constituted the sheath, had a mean denier of 1.6 and a mean birefringence of 0.035.

The single filament providing, in the form of serially-connected loops arranged in the form of a nest, the continuous sheath was spun down around the core strand in the plastic state, which facilitated the condensation and ensured good conformation between the two components of the core yarn. Within a short interval of time, say 30 minutes in a fairly humid atmosphere, when the core yarn was on the package, substantial crystallisation occurred and the loops constituting the sheath were set in position. This crystallisation, with the concomitant setting of the loops, may be accelerated by passing the core yarn, prior to its collection, through hot air.

There was good frictional adherence between the sheath and the core strand, and the yarn possessed a good strength (wet and dry), and a good stability i.e. there was little or no slippage between the sheath and the core strand, so that the yarn could be stored on the package indefinitely. Moreover, the sheath resisted attempts to unwind it from the core strand.

The yarn which had the appearance, and handle of a soft cotton yarn allied to a good tensile strength, could be readily dyed and fabrics made therefrom had a soft and warm handle with a good strength and abrasion resistance.

EXAMPLE 2

An apparatus assembly similar to that shown in FIGURES 2-3, in which the rotating hollow body was the godet shown in FIGURE 4, was used to wrap a plastic polyamide filament, around a 20 denier polyhexamethylene adipamide monofilament core strand. The nylon core strand was drawn off a suitable package, passed through the pigtail guide and the forwarding rolls before traversing, in the opposite direction to the core strand in the previous example, the axially-extending passage in the godet (entering at the nose and departing therefrom at the skirt), and then taken to the wind-up device. When the core strand was suitably tensioned, say 10 gms. denier, between the forwarding rolls and the wind-up device, a sleeve was propagated around the godet using the same procedure as in the previous example. To initiate wrapping in this instance, the operator moved the sleeve down the godet surface, by a pulling action, and more or less simultaneously with its endwise withdrawal therefrom, everted it, by introducing it into the axially-extending passage wherein it was associated with the core strand. To localise the region of association, and to assist the condensation of loops around the core strand, the composite structure comprising the core strand and the enveloping bundle of loops was passed through a stationary tube (two inches long and ⅜ inch internal diameter) located in the passage with the inlet orifice in the mouth thereof, some 3 mm. down the passage.

The resulting core yarn, which comprised a core strand surrounded by a relatively tight, approximately tubular sheath, had the following properties:

| | |
|---|---|
| Total denier | 263 |
| Denier regularity (percent mean deviation) | 11.8 |
| Tenacity (gms./denier) | 0.59 |
| Extensibility (percent) | 24.7 |
| Sheath denier | 243 |
| Twist level (t.p.i.)—sheath | 15 |
| Twist factor—sheath | 3.2 |
| Bulk density (gms./cc.$^3$)—sheath | 0.28 |
| Bulk factor (percent)—sheath | 1.35 |
| Sheath/core diameter ratio | 4.2:1 |

This core yarn in comparison with that of the previous example, had a superior denier regularity and a more attractive feel, arising from the evertion of the sleeve concurrently with its withdrawal from the godet.

EXAMPLES 3-7

The procedure of Example 1 or Example 2 was followed, save for the variations indicated, in the manufacture of core yarns in which the wrapping component was derived from one or more initially plastic polyhexamethylene adipamide filaments.

In Table 1 which follows, the procedure adopted, the operating conditions under which the various core yarns were derived, and some of the properties possessed by the yarns, are reported.

In all the examples, the polyhexamethylene adipamide used as the source of the filaments had an inherent viscosity of 0.882 (measured in 90 percent phenol/water at 25° C. and a concentration of 0.5 percent), and it contained 0.03 percent of titanium dioxide.

TABLE 1

Rotational speed of godet, 18,000 r.p.m.
Traverse speed, 2,500 cycles per minute
Mean filament denier (sheath), 1.6
Mean filament birefringence (sheath), 0.035

| Example No. | Procedure (Example 1 or 2) | Number of filaments wound on godet | Wind-up speed, feet/min. | Core properties | | | | Sheath properties | | | | | Core/sheath diameter ratio |
|---|---|---|---|---|---|---|---|---|---|---|---|---|---|
| | | | | Denier | Denier Regularity 1% mean deviation | Tenacity, (gms./den.) | Extensibility, percent | Denier | Twist Level (t.p.i.) | Twist Factor | Bulk Density, gm./cc. | Bulk Factor | |
| 3 | 1 | 1 | 50 | 218 | 14.4 | 1.03 | 32.0 | 198 | 30 | 5.1 | 0.27 | 1.46 | 5.3:1 |
| 4 | 1 | 2 | 50 | 466 | 14.1 | 0.88 | 86.0 | 446 | 30 | 8.8 | 0.21 | 2.22 | 7:1 |
| 5 | 2 | 1 | 50 | 455 | 9.2 | 0.41 | 32.2 | 435 | 30 | 8.6 | 0.36 | 1.40 | 6:1 |
| 6 | 2 | 2 | 50 | 408 | 12.4 | 0.92 | 26.8 | 388 | 30 | 7.85 | 0.22 | 0.98 | 7.1:1 |
| 7 | 2 | 2 | 100 | 500 | 14.2 | 0.47 | 26.5 | 480 | 15 | 4.53 | 0.40 | 1.65 | 6:1 |

It will be observed from the table that the core yarns made by the procedure of Example 2 involving eversion of the sleeve during withdrawal had an improved denier regularity, and a more compact sheath (higher bulk density and lower bulk factor) compared with comparable core yarns made by the procedure of Example 1.

EXAMPLES 8–32

In these examples, an elastic yarn identified in the table was wrapped, while under stretch, using essentially the same procedure described with reference to Example 1 or 2, with initially plastic polyhexamethylene adipamide filament or filaments. The nature of the elastic core strand, number of filaments constituting the wrapping component and the operating conditions in each example, together with some of the properties of the resulting core yarns are reported in Table 2 which follows:

TABLE 2

Rotational speed of godet, 18,000 r.p.m.
Traverse speed, 2,500 cycles per minute
Mean "filament" denier in sheath, 1.6
Mean "filament" birefringence in sheath, 0.035

| Ex. No. | Procedure (Ex. 1 or 2) | Nature of elastic core strand | Extension of core strand during wrapping, percent | Number of filaments wound around the godet | Wind-up speed (feet/min.) | Core Yarn Properties | |
|---|---|---|---|---|---|---|---|
| | | | | | | Denier | Denier Regularity, percent mean deviation |
| 8 | 1 | 70 denier polyesterurethane monofilament.[1] | 300 | 1 | 40 | 368 | 17.64 |
| 9 | 1 | ...do... | 250 | 1 | 35 | 432 | 15.6 |
| 10 | 2 | ...do... | 500 | 1 | 60 | 288 | 12.8 |
| 11 | 2 | ...do... | 400 | 1 | 50 | 348 | 10.63 |
| 12 | 2 | ...do... | 400 | 1 | 25 | 397 | 11.55 |
| 13 | 2 | ...do... | 300 | 1 | 25 | 417 | 18.5 |
| 14 | 1 | 280 denier two filament polyesterurethane yarn.[1] | 400 | 3 | 50 | 948 | 15.4 |
| 15 | 1 | ...do... | 200 | 3 | 30 | 1,302 | 11.7 |
| 16 | 1 | ...do... | 250 | 3 | 35 | 1,043 | 15.6 |
| 17 | 1 | ...do... | 250 | 2 | 35 | 852 | 11.6 |
| 18 | 2 | ...do... | 400 | 2 | 50 | 418 | 13.2 |
| 19 | 2 | ...do... | 200 | 2 | 30 | 838 | 13.2 |
| 20 | 2 | ...do... | 250 | 2 | 35 | 718 | 10.98 |
| 21 | 2 | ...do... | 250 | 1 | 35 | 478 | 12.15 |
| 22 | 2 | ...do... | 250 | 1 | 70 | 380 | 11.10 |
| 23 | 1 | 250 denier "Lycra" monofilament.[2] | 600 | 2 | 35 | 823 | 15.9 |
| 24 | 1 | ...do... | 700 | 2 | 40 | 700 | 13.0 |
| 25 | 1 | ...do... | 500 | 1 | 30 | 643 | 10.8 |
| 26 | 1 | ...do... | 700 | 1 | 40 | 627 | 12.0 |
| 27 | 2 | ...do... | 300 | 2 | 40 | 667 | 11.33 |
| 28 | 2 | ...do... | 700 | 2 | 40 | 492 | 13.2 |
| 29 | 2 | ...do... | 600 | 2 | 35 | 667 | 15.4 |
| 30 | 2 | ...do... | 800 | 2 | 45 | 662 | 15.0 |
| 31 | 2 | ...do... | 700 | 1 | 40 | 553 | 15.8 |
| 32 | 2 | ...do... | 600 | 1 | 35 | 582 | 16.94 |

| Ex. No. | Core Yarn Properties | | Board retraction under 50 gm. weight | | Sheath Properties | | |
|---|---|---|---|---|---|---|---|
| | Tenacity, (gms./den.) | Extensibility, percent | After 1 hr., percent | After 24 hrs., percent | Denier | Twist Level, t.p.i. | Twist Factor | Bulk Factor, percent |
| 8 | 0.66 | 212 | 78.8 | 76.7 | 350 | 37.5 | 9.68 | 2.48 |
| 9 | 0.8 | 192 | 81.8 | 79.6 | 412 | 40 | 12.25 | 2.71 |
| 10 | 0.56 | 105.7 | 83.0 | 81.4 | 276 | 25.0 | 5.66 | 4.81 |
| 11 | 0.56 | 170.4 | 83.5 | 82.7 | 334 | 30 | 7.50 | 3.47 |
| 12 | 0.63 | 138.8 | 80.3 | 78.6 | 283 | 62.5 | 14.2 | 1.07 |
| 13 | 0.62 | 74.4 | 96.2 | 95.4 | 399 | 62.5 | 17.2 | 0.85 |
| 14 | 0.52 | 233 | 69.7 | 66.3 | 892 | 30 | 12.4 | 2.11 |
| 15 | 0.56 | 218 | 86.4 | 83.6 | 1,209 | 50 | 23.8 | 2.05 |
| 16 | 0.48 | 226 | 76.4 | 73.7 | 963 | 44 | 18.9 | 2.35 |
| 17 | 0.62 | 199 | 72.7 | 70.0 | 772 | 44 | 16.7 | 1.43 |
| 18 | 0.89 | 169.0 | 97.2 | 97.1 | 362 | 30 | 7.6 | 1.36 |
| 19 | 0.54 | 86.8 | 98.9 | 98.7 | 745 | 50 | 13.7 | 1.21 |
| 20 | 0.69 | 109 | 93.5 | 92.6 | 638 | 44 | 15.2 | 1.02 |
| 21 | 0.48 | 103.7 | 77.0 | 73.5 | 398 | 44 | 12.2 | 2.03 |
| 22 | 0.58 | 184 | 74.0 | 70.6 | 300 | 20 | 4.76 | 3.52 |
| 23 | 0.54 | 149 | 60.3 | 58.4 | 787 | 44 | 15.5 | 1.23 |
| 24 | 0.47 | 201 | 67.4 | 66.3 | 669 | 37.5 | 13.3 | 1.48 |
| 25 | 0.45 | 168 | 59.0 | 57.0 | 601 | 50 | 16.8 | 1.20 |
| 26 | 0.44 | 164 | 42.2 | 30.7 | 596 | 37.5 | 13.5 | 1.17 |
| 27 | 0.67 | 102.6 | 92.9 | 90.7 | 604 | 37.5 | 12.6 | 2.68 |
| 28 | 0.49 | 123.8 | 92.9 | 90.9 | 461 | 37.5 | 11.1 | 1.74 |
| 29 | 0.78 | 151.1 | 86.0 | 82.1 | 631 | 44 | 15.1 | 1.45 |
| 30 | 0.46 | 187.8 | 67.9 | 65.9 | 634 | 34 | 11.7 | 1.78 |
| 31 | 0.51 | 126.0 | 61.0 | 60.4 | 522 | 37.5 | 11.7 | 2.99 |
| 32 | 0.42 | 136.2 | 69.8 | 67.4 | 546 | 44 | 14.1 | 2.56 |

[1] The polyesterurethane monofilament of Examples 8–13 and the yarn of Examples 14–22 are described in the specification of our copending application.
[2] Lycra is a Registered Trade Mark for an elastomeric yarn available from E.I. du Pont de Nemours.

The elastic core yarns provided by Examples 8–32, have good stretch and recovery properties allied to the soft handle and appealing feel associated with a spun staple yarn. They are particularly suitable for incorporation into fabrics from which are derived woven or knitted swimwear, hosiery, brassieres and pyjamas. The wrapping component fits around the elastic core strand in the form of an approximately tubular sleeve, which is set in position on crystallisation of the plastic polyamide filaments. The structure of the wrapping component is such that the elastice core strand can extend and contact without much resistance therefrom.

EXAMPLES 33–37

These examples illustrate the manufacture of an insulated electrical conductor by wrapping a 36 gauge shellac coated copper wire with initially plastic, polyhexamethylene adipamide filaments, using essentially the same procedure as described in Examples 1 or 2 hereinbefore.

The operating conditions used in the various examples, the number of filaments used in the formation of the wrapping component, and some of the properties of the insulated conductors are reported in Table 3 which follows:

TABLE 3

[Rotational speed of godet, 18,000 feet per minute; Traverse speed, 2,500 cycles per minute]

| Example No. | Example procedure (Example 1 or 2) | No. of filaments | Wind-up speed (feet/minute) | Properties | | | | | |
|---|---|---|---|---|---|---|---|---|---|
| | | | | Sheath Denier | Twist Level (t.p.i.) | Twist Factor | Sheath/Core diameter ratio | Bulk Factor | Bulk Density, gms./cc.³ |
| 33 | 1 | 4 | 20 | 1,930 | 75 | 4.4 | 4.5:1 | 1.09 | 0.16 |
| 34 | 1 | 4 | 50 | 846 | 30 | 3.0 | 2.8:1 | 2.81 | 0.17 |
| 35 | 2 | 4 | 25 | 1,682 | 62.5 | 3.41 | 3.1:1 | 1.25 | 0.27 |
| 36 | 1 | 4 | 50 | 855 | 30 | 1.18 | 2.4:1 | 1.97 | 0.23 |
| 37 | 1 | 3 | 25 | 1,257 | 62.5 | 3.03 | 2.6:1 | 0.92 | 0.25 |

The wrapping component may be derived from filaments other than polyhexamethylene adipamide filaments and the process described has been operated successfully using filaments derived from a wide variety of polymeric materials. For example, suitable filaments are prepared from other fibre-forming polyamides including polyepsilon caprolactam and poly-omega-aminoundeconoic acid, polyesters, such as polyethylene terephthalate, cellulosics, such as cellulose acetate or triacetate, polyacrylics, vinyl polymers, vinylidene polymers, polyurethanes, polyhydrocarbons, and so on. Heterofilaments, and filaments derived from blends of polymeric materials may also be used.

Preferred among these polymers are the melt-spinnable ones, filaments derived from which are drawn at spinning and in the same operation by which they are forwarded to the rotating body serving to collect the filament(s) in the form of a sleeve and to insert twist in the wrapping component formed from the sleeve.

The filament or filaments used in the formation of the wrapping component may have a normal cross-section such as that obtained using a circular spinning orifice during filament formation.) However, multi-lobal filaments and filaments having an axial passage can likewise be used and they may impart desirable effects to the core yarns or fabrics derived therefrom.

From the foregoing, it will be appreciated that the advantages of this invention are manifold. The core yarns, and the fabrics into which such yarns are made up, will tend, because of the nature of the sheath, to have those properties, notably handle or feel, covering power and warmth, normally associated with spun staple yarn structures. In addition, the properties inherent in the material forming the continuous filaments will be present, for example, the hard wearing, good strength and no-rotting characteristics associated for example with polyamide yarns and fabrics. The core yarns can readily be handled by conventional textile machinery and have been woven and knitted into useful fabrics. The fabrics on account of the bulk of the yarns from which they are made, have a good warmth and covering power. Moreover, the core strand itself may impart desirable properties, say a high tensile strength, electrical conductivity or elasticity, to the core yarns containing it.

The core yarn is simply and economically prepared, by a process which does not require elaborate equipment and which is integrated with the spinning of the continuous filament(s) constituting the wrapping component from a source material. The process utilises extremely fine denier continuous filament(s) to produce a wrapping component of a greatly enhanced denier, which completely surrounds the centrally disposed core strand in an approximately tubular sheath which is stable in the subsequent processing of the core yarns into fabrics without the necessity of a heat-setting treatment.

What we claim is:

1. A core yarn comprising a centrally disposed core strand and a wrapping component constituted by one or more continuous filaments wherein the wrapping component exists as a multiplicity of random, serially-connected, essentially axially-extending loops of variable length arranged so that they progressively advance along the axis and twist around the core strand with many of the loops being contained for at least part of their length within another loop thereby providing a nest of loops which, as a continuous and compact approximately tubular sheath completely envelops the core strand.

2. A core yarn as claimed in claim 1 wherein the wrapping component is derived from at least one continuous filament composed of a snythetic organic polymer.

References Cited

UNITED STATES PATENTS

| 2,120,270 | 6/1938 | Tucker | 57—12 X |
| 2,324,989 | 7/1943 | Alderfer | 57—152 |
| 3,041,812 | 7/1962 | Marshall. | |
| 3,078,653 | 2/1963 | Marshall | 57—144 X |
| 3,153,316 | 10/1964 | Livingston | 57—144 |
| 3,092,953 | 6/1963 | Blackstock | 57—12 X |
| 3,158,982 | 12/1964 | Marshall | 57—140 |
| 3,180,115 | 4/1965 | Marshall | 57—152 X |

FOREIGN PATENTS

| 612,897 | 4/1935 | Germany. |
| 1,045,454 | 10/1966 | Great Britain. |

FRANK J. COHEN, *Primary Examiner.*

W. H. SCHROEDER, *Assistant Examiner.*

UNITED STATES PATENT OFFICE
CERTIFICATE OF CORRECTION

Patent No. 3,388,545 June 18, 1968

Cyril George Cannon et al.

It is certified that error appears in the above identified patent and that said Letters Patent are hereby corrected as shown below:

Columns 27 and 28, footnote to TABLE 2, line 2 thereof, "our copending application" should read -- co-assigned patent No. 3357954 --.

Signed and sealed this 31st day of March 1970.

(SEAL)
Attest:

Edward M. Fletcher, Jr.
Attesting Officer

WILLIAM E. SCHUYLER, JR.
Commissioner of Patents